US012604374B2

(12) United States Patent
Kotapish

(10) Patent No.: US 12,604,374 B2
(45) Date of Patent: Apr. 14, 2026

(54) SPLATTER COVER AND APPARATUS FOR USE IN MICROWAVE OVENS

(71) Applicant: Glen E. Kotapish, Fredericksburg, VA (US)

(72) Inventor: Glen E. Kotapish, Fredericksburg, VA (US)

( * ) Notice: Subject to any disclaimer, the term of this patent is extended or adjusted under 35 U.S.C. 154(b) by 1233 days.

(21) Appl. No.: 17/460,148

(22) Filed: Aug. 27, 2021

(65) Prior Publication Data

US 2023/0060827 A1 Mar. 2, 2023

(51) Int. Cl.
*H05B 6/64* (2006.01)
*H05B 6/80* (2006.01)

(52) U.S. Cl.
CPC .................................. *H05B 6/6408* (2013.01)

(58) Field of Classification Search
CPC ....... H05B 6/6408; A47J 36/027; B56D 51/16
USPC ....... 219/725, 731, 734, 732, 735, 729, 762; 99/451; 426/241; 220/252, 367.1, 369, 220/573.1, 574
See application file for complete search history.

(56) References Cited

U.S. PATENT DOCUMENTS

| | | | | |
|---|---|---|---|---|
| 5,436,434 A * | 7/1995 | Baird | ........................ | H05B 6/64 219/734 |
| 5,801,363 A * | 9/1998 | Michaluk, III | ......... | F24C 15/16 219/403 |
| 10,582,802 B2 * | 3/2020 | Caswell | ............... | H05B 6/6408 |

* cited by examiner

*Primary Examiner* — Quang T Van
(74) *Attorney, Agent, or Firm* — Hoang Steve Ngo

(57) ABSTRACT

One aspect of the present invention is a splatter cover for minimizing or preventing food and drink splatters inside microwave ovens. The splatter cover may be a one-piece, splatter cover, a two-piece, splatter cover, or a splatter cover made or manufactured of more than two pieces or sections. Another aspect of the present invention is a splatter cover apparatus that includes a splatter cover and at least one securing device for minimizing or preventing food and drink splatters inside microwave ovens. When the splatter cover is a two-piece, splatter cover or a splatter cover made or manufactured of more than two pieces, then it's preferred that the splatter cover apparatus includes both the first securing device and second securing device. In general, the splatter cover and splatter cover apparatus are preferably left in place inside the microwave oven after use and when the microwave oven is not in use.

20 Claims, 40 Drawing Sheets

262', 282'

SPLATTER COVER AND APPARATUS FOR USE IN MICROWAVE OVENS

BACKGROUND OF THE INVENTION

Field of the Invention

The present invention generally relates to covers, devices, apparatuses, and systems for minimizing or preventing food and drink splatters inside microwave ovens. More specifically, one aspect of the present invention is a splatter cover for minimizing or preventing food and drink splatters inside microwave ovens. Another aspect of the present invention is an apparatus that includes a splatter cover for minimizing or preventing food and drink splatters inside microwave ovens. In general, the splatter cover of the present invention is preferably left in place inside the microwave oven after use and when the microwave oven is not in use.

Description of the Related Art

Covers, devices, apparatuses, and systems for minimizing or preventing food and drink splatters inside microwave ovens are known in the art.

The present invention overcomes one or more of the shortcomings of covers, devices, apparatuses and systems for minimizing or preventing food and drink splatters inside microwave ovens. The Applicant is unaware of inventions or patent documents, taken either singly or in combination, which are seen to describe the present invention as claimed.

One advantage of the present invention, once the splatter cover of the present invention has been attached, secured or mounted inside a microwave oven, is that it allows for a user of the microwave oven to avoid touching or handling the splatter cover prior to use, unless for washing or cleaning of the splatter cover, or for changing the height position, lateral or side-to-side position, and/or forward-to-rearward position of the splatter cover with respect to the position(s) of the microwave oven turntable plate, bottom side of the microwave oven, and/or food or drink container. This advantage may be especially beneficial to kids, young people, elderly people, handicap people, people who cannot do too many functions, and people who want or need to simplify the use of a microwave oven.

Another advantage of the present invention is that it helps to keep the microwave oven itself and/or the area in proximity of the microwave oven more clean, neat and/or tidy since the splatter cover of the present invention may be positioned or stored inside the microwave oven most or all of the time, unless for cleaning or washing, after use without having the need for the user or someone else thinking or remembering where to store the splatter cover.

A further advantage of the present invention, when the present invention is an apparatus that includes at least one securing device, is that it allows for the use or operational position of the splatter cover to be adjustable with regard to height position, lateral or side-to-side position, and/or forward-to-rearward position of the splatter cover with respect to the position(s) of the microwave oven turntable plate, bottom side of the microwave oven, and/or food or drink container such that a single splatter cover can generally be effectively used inside microwave ovens having interior spaces of different heights, lengths, widths, and/or shapes and can generally be effectively used with plates, cups, and/or food or drink containers of different lengths, widths, heights, and/or shapes.

An additional advantage of the present invention is that it may help to prevent the splatter cover of the present invention from being misplaced, lost, or difficult to find.

Another advantage of the present invention is that it may help to keep the splatter cover of the present invention from accumulating dust or getting dirty from the surrounding environment when compared to splatter covers that are positioned or stored outside the microwave oven.

A further advantage of the present invention is that a two-piece, splatter cover of the present invention may be simpler and/or less costly to manufacture, store, package, and/or ship when compared to certain splatter covers known in the art, such as one-piece covers having a larger diameter than the diameter of a single piece or section of the two-piece, splatter cover (wherein the two pieces or sections can be stacked on top of one another for storing, packaging, and/or shipping) of the present invention and also such as covers that include or contain magnet(s) embedded in or secured to the cover.

An additional advantage of the present invention is that various alternative securing devices, such as, but not limited to, suctions or suction cups, of the present invention can be moved upward and downward (for height adjustment), rightward and leftward (for lateral adjustment), and/or forward and rearward (for width adjustment) to particular securing points on a securing side or wall of a microwave oven to adjust to and to accommodate the different heights, lengths, widths, and/or shapes of plates, cups, and/or food or drink containers.

SUMMARY OF THE INVENTION

One aspect of the present invention is a splatter cover for minimizing or preventing food and drink splatters inside microwave ovens. The splatter cover may be a one-piece, splatter cover, a two-piece, splatter cover, or a splatter cover made or manufactured of more than two pieces or sections. Another aspect of the present invention is a splatter cover apparatus that includes a splatter cover and at least one securing device for minimizing or preventing food and drink splatters inside microwave ovens. When the splatter cover is a two-piece, splatter cover or a splatter cover made or manufactured of more than two pieces, then it's preferred that the splatter cover apparatus includes both the first securing device and second securing device. In general, the splatter cover and splatter cover apparatus are preferably left in place inside the microwave oven after use and when the microwave oven is not in use.

With regard to the different embodiments of the present invention where the splatter cover is a two-piece, splatter cover or splatter cover made or manufactured of more than two pieces or sections, each of the first cover section and second cover section may have various dimensions and configurations to complement the dimensions and configurations of one another such that, preferably prior to operation but, alternatively, could be soon after operation initiation, the first cover section and second cover section are initiated for operation by the user, such as, but not limited to, when the door of the microwave oven goes from the open position to the closed position by the user closing the door, to come together or toward one another to operationally form the two-piece, splatter cover or splatter cover made or manufactured of more than two pieces or sections and partially, substantially, or entirely surround and/or cover the food, drink, and/or food or beverage container, vessel, heating element, or retaining device to minimize or prevent splatters during microwave oven operation.

It should be understood that the above-attached figures are not intended to limit the scope of the present invention in any way.

DETAILED DESCRIPTION OF THE EMBODIMENTS AND ASPECTS OF THE PRESENT INVENTION

Figure 1:
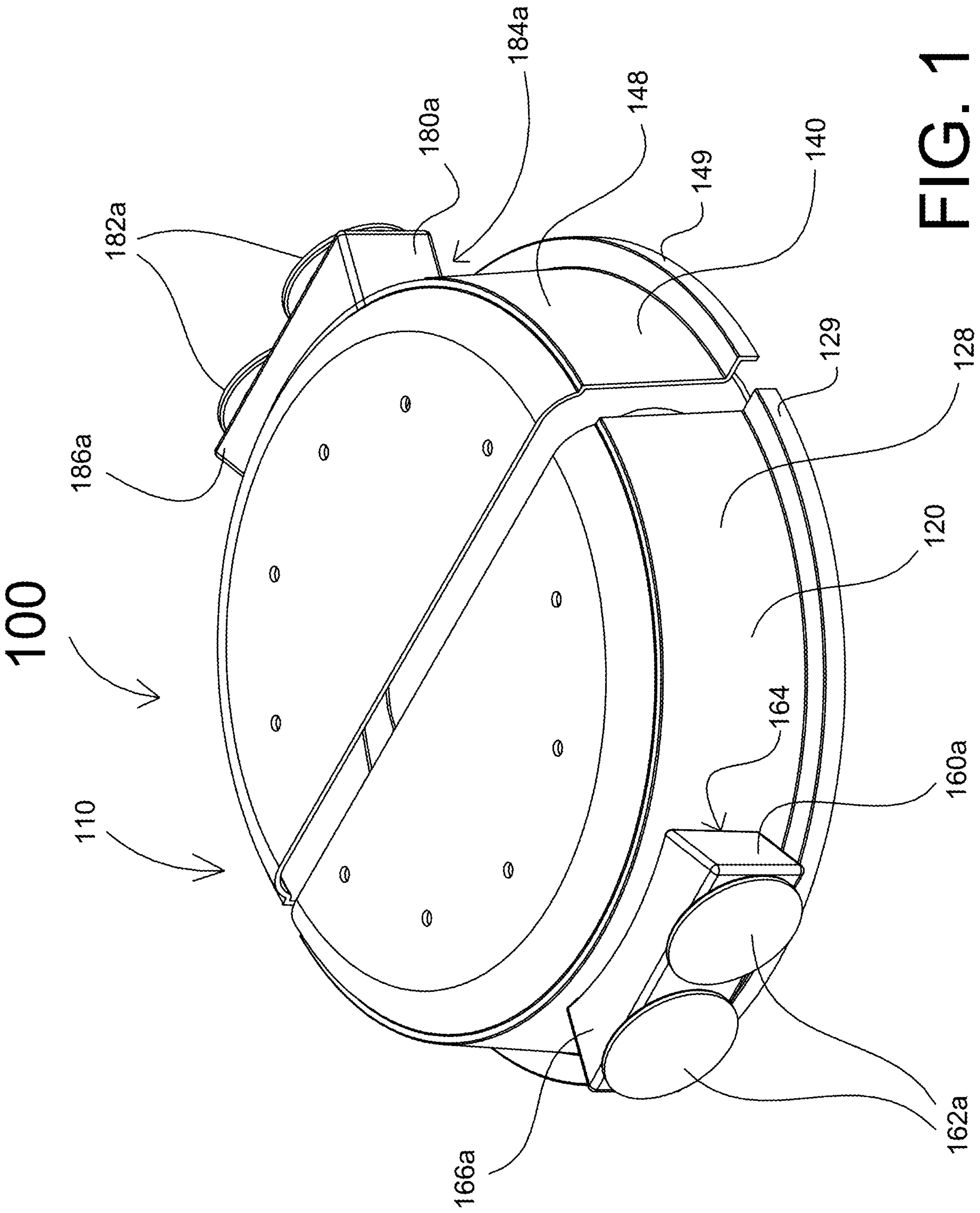
FIG. 1 is a perspective view of a first embodiment of a splatter cover apparatus according to the present invention, wherein the apparatus includes a two-piece splatter cover and securing devices.
Figure 2:
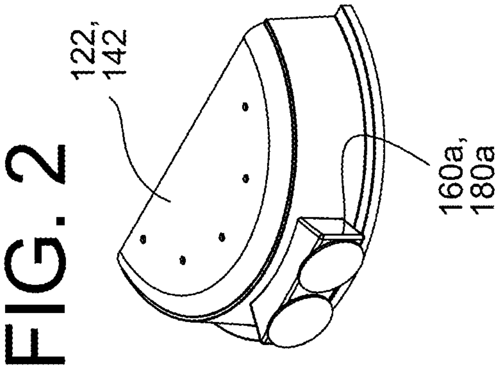
FIG. 2 is a perspective view of one cover section of the two-piece splatter cover of FIG. 1.
Figure 3:
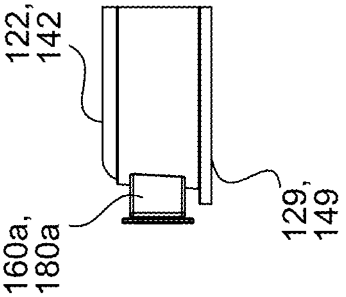
FIG. 3 is a side view of the one cover section of FIG. 2.
Figure 4:
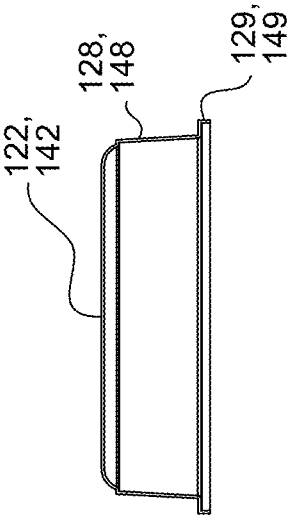
FIG. 4 is a front view of the one cover section of FIG. 2.
Figure 5:
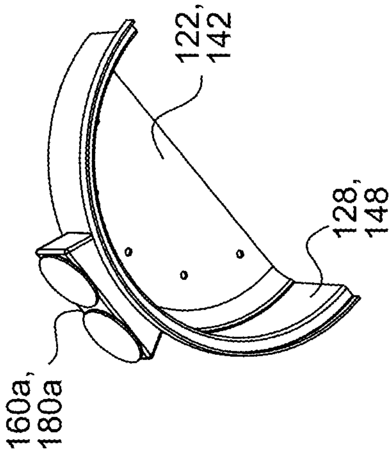
FIG. 5 is a perspective, rear, bottom view of the one cover section of FIG. 2.
Figure 6:
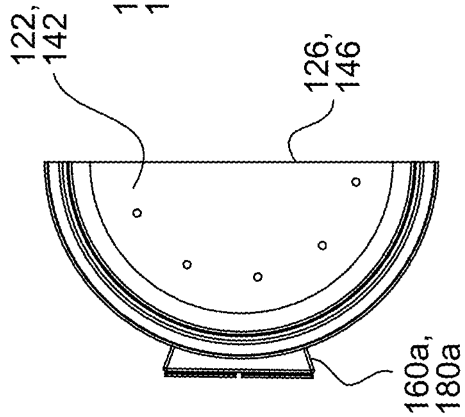
FIG. 6 is a bottom view of the one cover section of FIG. 2.
Figure 7:
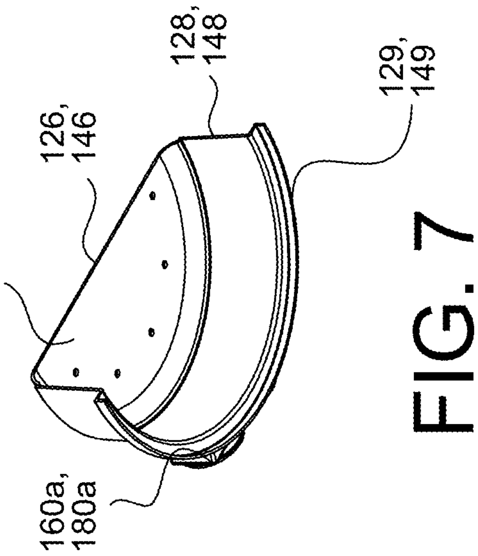
FIG. 7 is a perspective, front, bottom view of the one cover section of FIG. 2.
Figure 52:
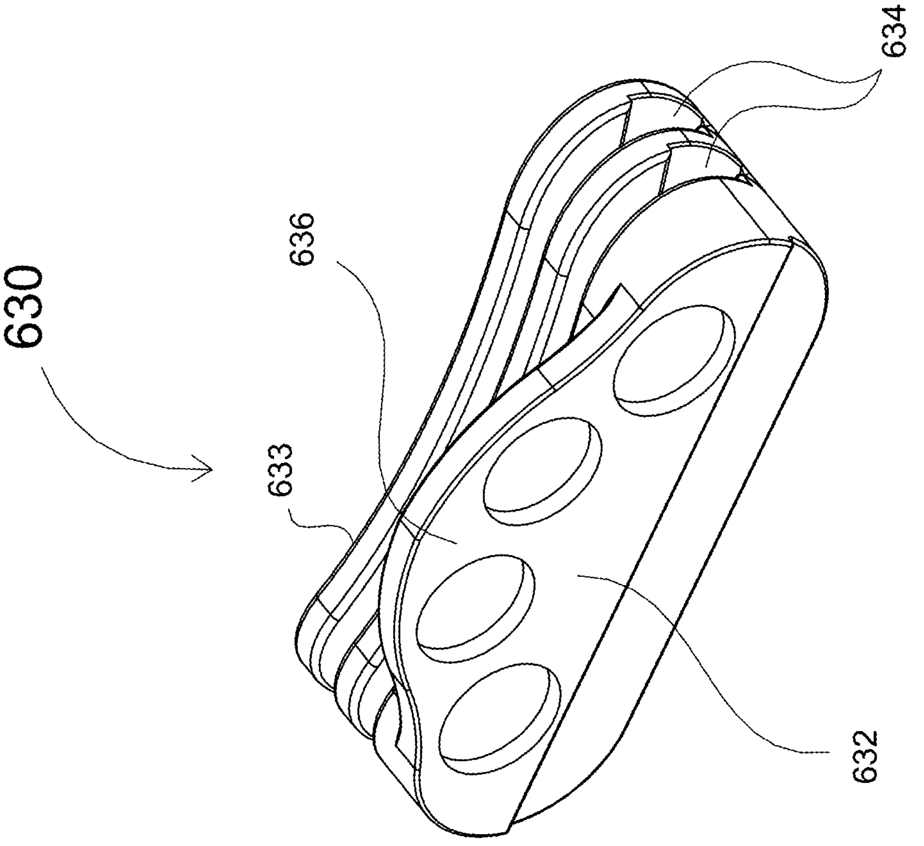
FIG. 52 is a perspective view of the securing device of FIG. 51.

Referring to FIGS. 1-52, one aspect of the present invention is a splatter cover 110,210,310,410,510 for minimizing or preventing food and drink splatters inside microwave ovens OV. The splatter cover can be a one-piece, splatter cover 610,710 (as shown in FIGS. 45-50), a two-piece, splatter cover 110,210,310,410 (as shown in FIGS. 1-13 and 21-33), or a splatter cover 510 made or manufactured of more than two pieces or sections (as shown in FIGS. 34-39). Another aspect of the present invention is a splatter cover apparatus 100,200,300,400,500 that includes a splatter cover 110,210,310,410,510 and at least one securing device 160*a*, 160*b*,180*a*,180*b*,260,260',260",260''',260"",280, 280',280", 280''',280"",360,360',360",360''',360"",380,380',380",380''', 380"",660, 680, such as, but not limited to, a first securing device 160*a*,160*b*,260,260',260", 260''',260"",360,360', 360",360''',360"",660 and a second securing device 180*a*, 180*b*,280,280',280",280''',280"",380,380',380",380''',380"", 680, for minimizing or preventing food and drink splatters inside microwave ovens OV. When the splatter cover is a two-piece, splatter cover 110,210,310,410 or a splatter cover 510 made or manufactured of more than two pieces, then it's preferred that the splatter cover apparatus 100,200,300,400, 500 includes both the first securing device 160*a*,160*b*,260, 260',260",260''',260"",360,360',360", 360''',360"",660 and second securing device 180*a*,180*b*,280,280',280",280''', 280"",380,380',380",380''',380"",680. In general, the splatter cover 110,210,310, 410,510 and splatter cover apparatus 100,200,300,400,500 are preferably left in place inside the microwave oven OV after use and when the microwave oven OV is not in use.

Figure 24:
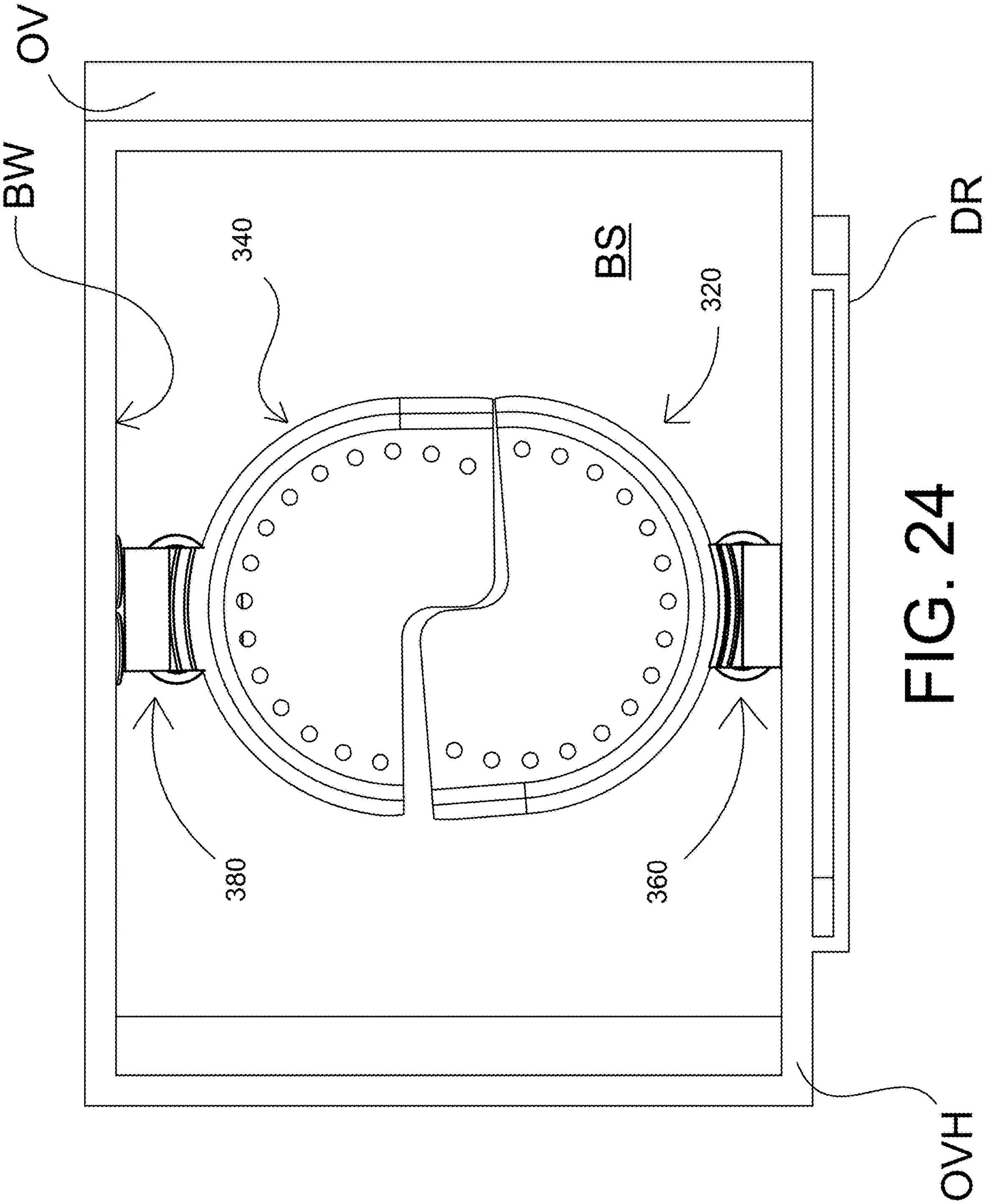
FIG. 24 is an environmental, top view of the splatter cover apparatus of FIG. 21, wherein the door of the microwave oven is in a closed position for use or operation, and wherein the top of the microwave oven has been removed for better viewing.
Figure 25:
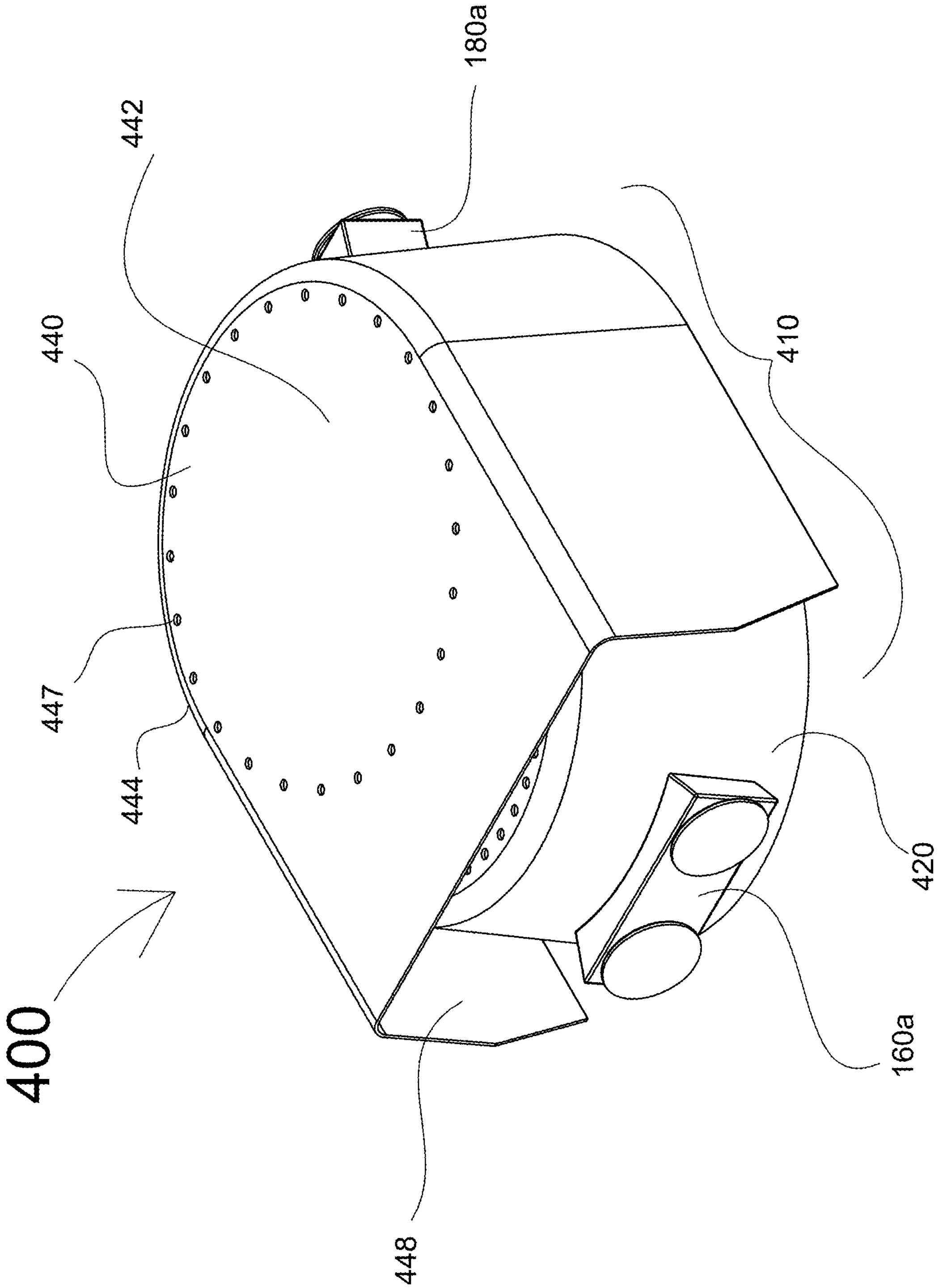
FIG. 25 is a perspective view of a fourth embodiment of a splatter cover apparatus according to the present invention, wherein the apparatus includes a two-piece splatter cover and securing devices.
Figure 26:
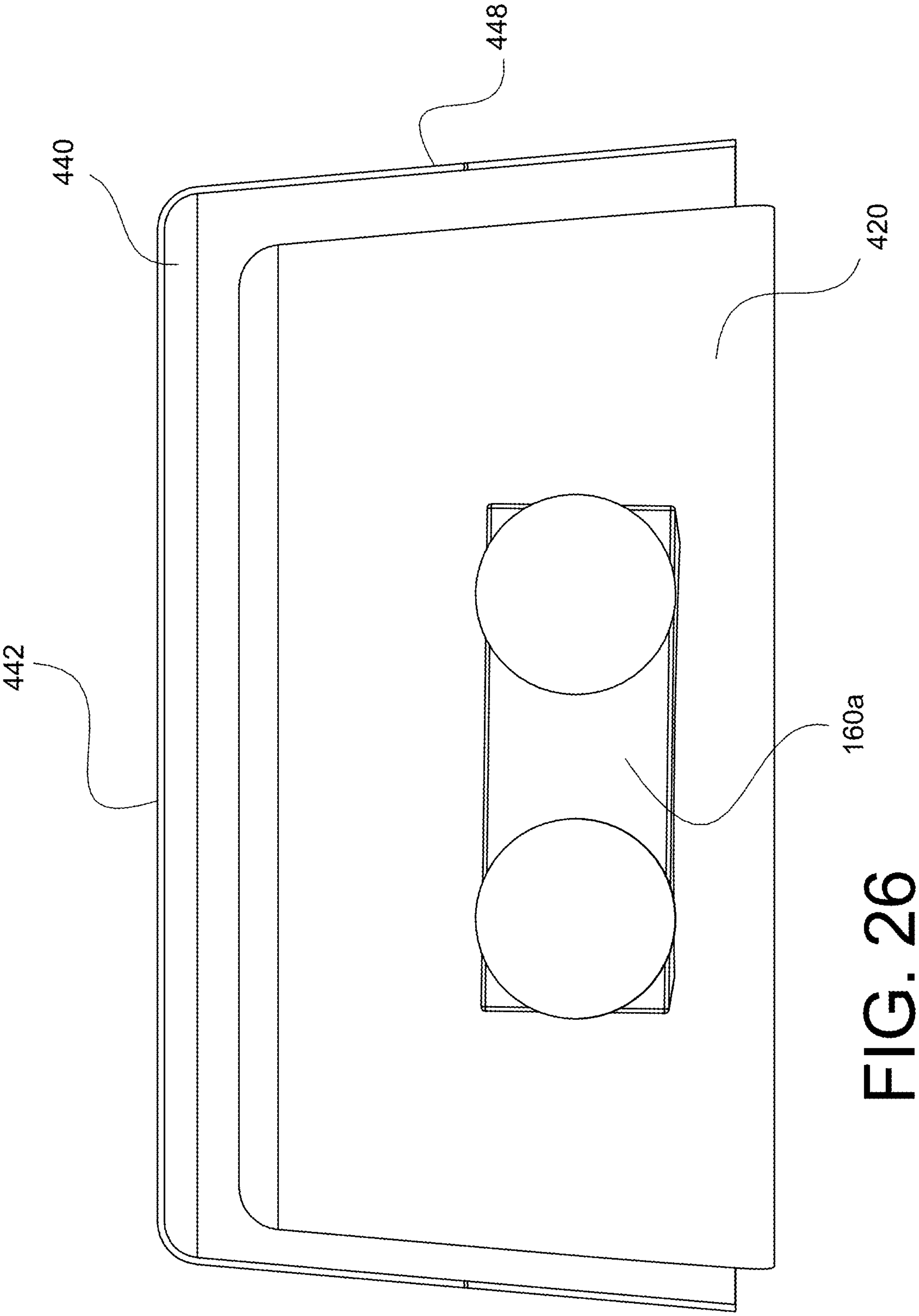
FIG. 26 is a rear view of the splatter cover apparatus of FIG. 25.
Figure 27:
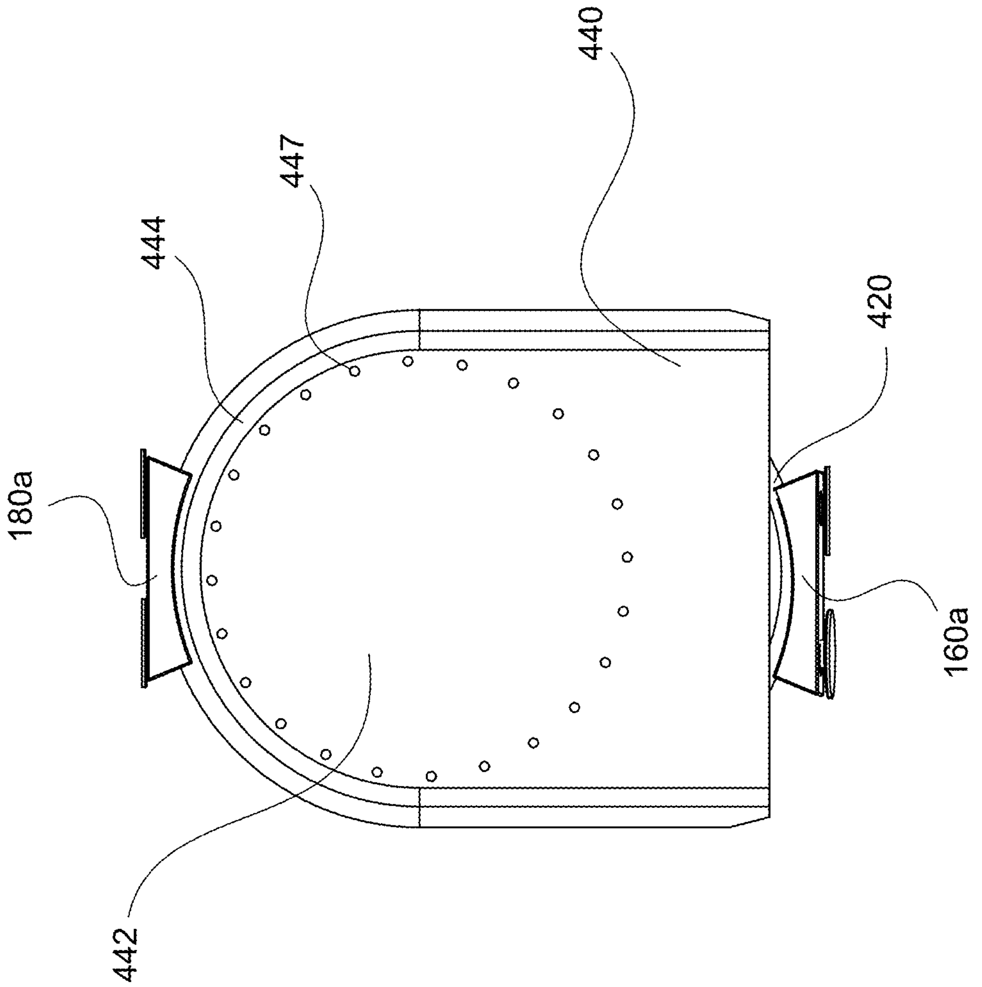
FIG. 27 is a top view of the splatter cover apparatus of FIG. 25.
Figure 28:
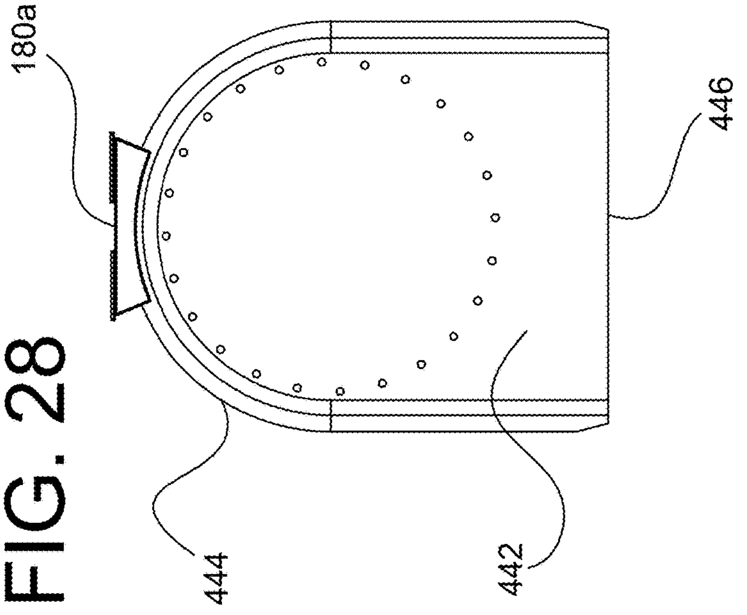
FIG. 28 is a top view of a larger cover section of the splatter cover apparatus of FIG. 25.
Figure 29:
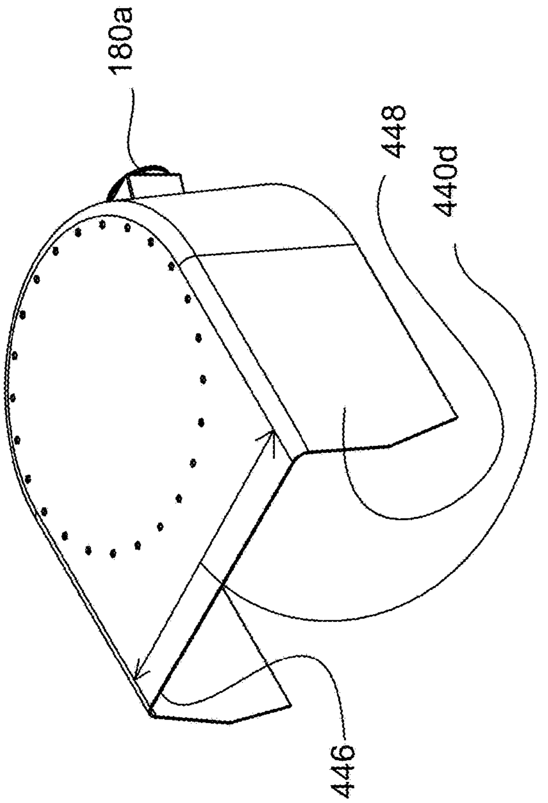
FIG. 29 is a perspective, front, top view of the larger cover section of the splatter cover apparatus of FIG. 25.
Figure 30:
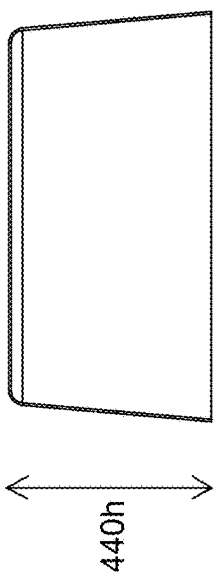
FIG. 30 is a front view of the larger cover section of the splatter cover apparatus of FIG. 25.
Figure 31:
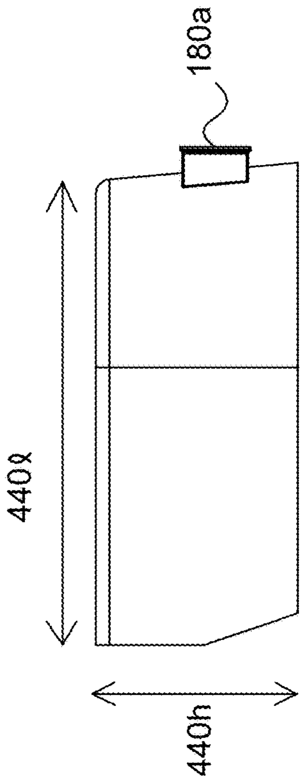
FIG. 31 is a side view of the larger cover section of the splatter cover apparatus of FIG. 25.
Figure 32:
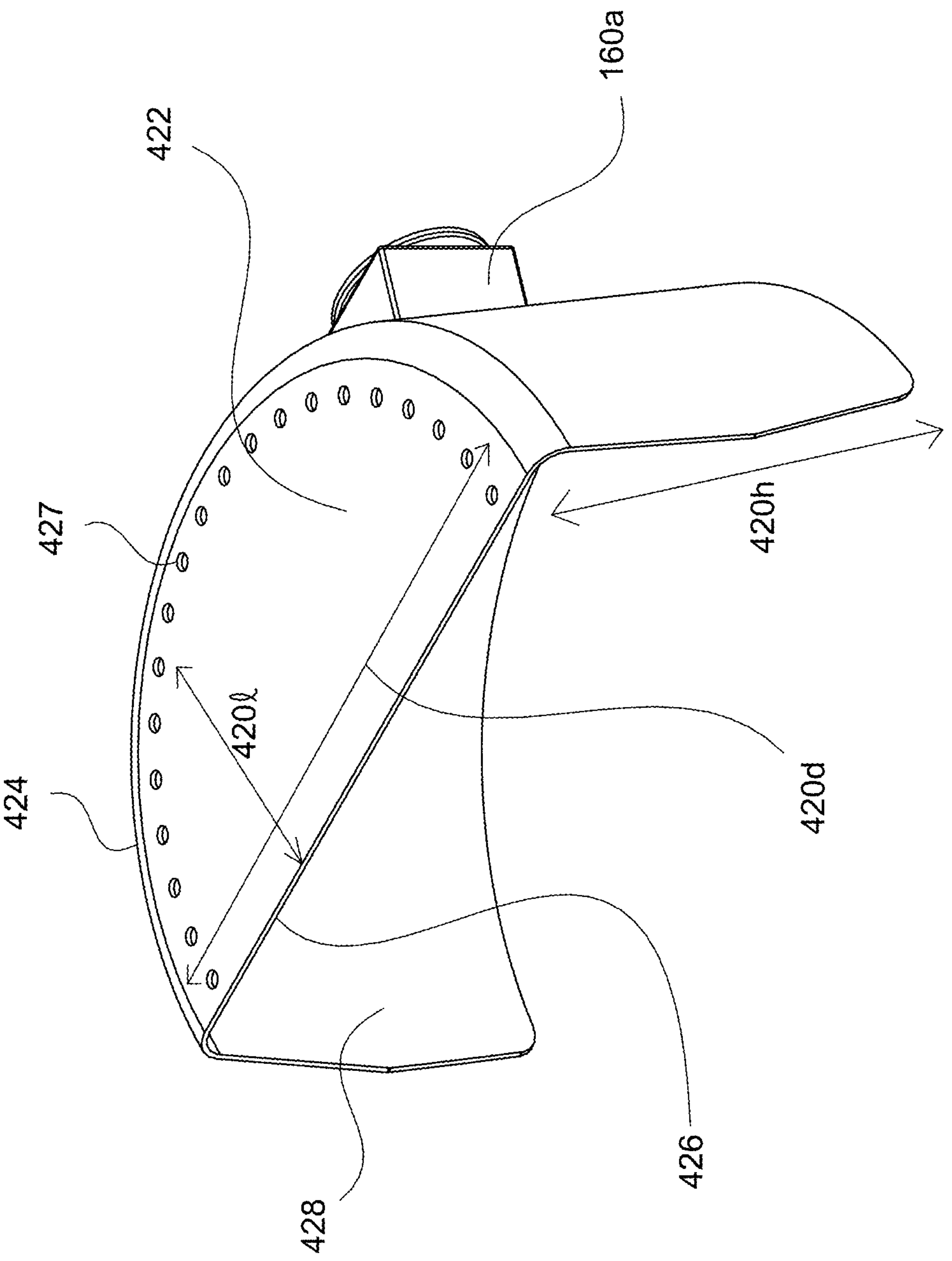
FIG. 32 is a perspective, front, top view of a smaller cover section of the splatter cover apparatus of FIG. 25.
Figure 33:
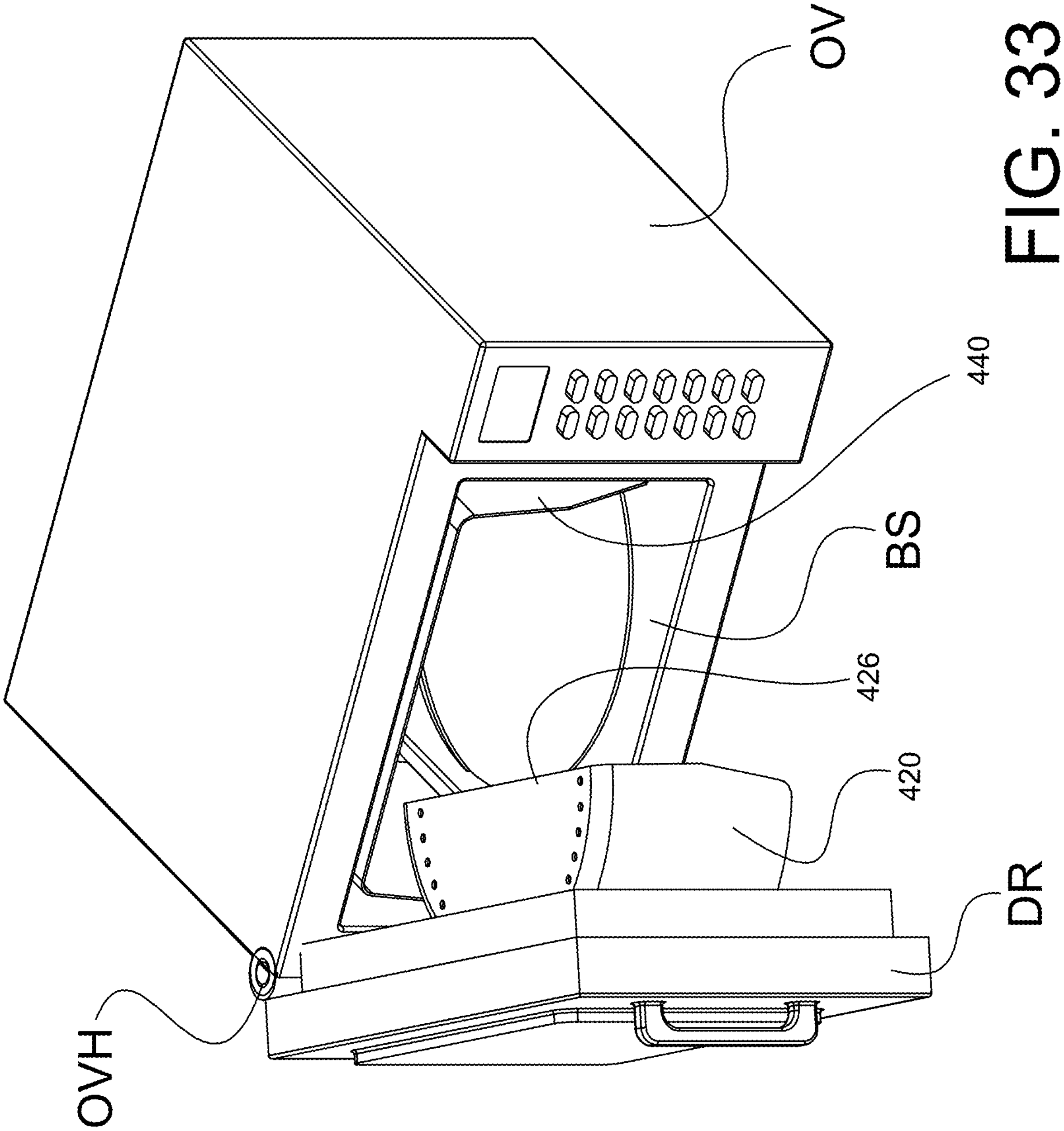
FIG. 33 is an environmental, perspective view of the splatter cover apparatus of FIG. 25, wherein the door of the microwave oven is in an open position.

With regard to the different embodiments of the present invention where the splatter cover is a two-piece, splatter cover 110,210,310,410, each of the first cover section 120, 220,320,420 and second cover section 140,240,340,440 of a particular may have various dimensions and configurations to complement the dimensions and configurations of one another such that, preferably prior to operation but, alternatively, could be soon after operation initiation, the first cover section 120,220,320,420 and second cover section 140,240, 340,440 are initiated for operation by the user, such as, but not limited to, when the door DR of the microwave oven OV goes from the open position (shown in FIG. 12) to the closed position (shown in FIG. 13) by the user closing the door DR, to come together or toward one another to operationally form the two-piece, splatter cover 110,210,310,420 and partially, substantially, or entirely surround and/or cover the food FD, drink, and/or food or beverage container, vessel, heating element, or retaining device CONT (shown in FIGS. 11-12), such as, but not limited to, a cup, a mug, a bowl, a plate, a food storage container, a food heating container, or a food defrosting container, to minimize or prevent splatters during microwave oven operation. When the first cover section 120,220,320,420 and second cover section 140,240, 340,440 come together or toward one another to operationally form the two-piece, splatter cover 110,210,310,410, the engagement surface or area 126,226,326,426 of the first cover section 120,220,320,420 and the engagement surface or area 146,246,346,446 of the second cover section 140, 240,340 may meet and touch one another, may be separated by a small distance that creates a vent operationally while still minimizing or preventing splatters (as shown in FIGS. 1, 13 and 24), or may be positioned under and over the top of one another due to different sizes of the first cover section 420 and second cover section 440 (shown in FIGS. 25-27 and 33).

In a non-limiting, first embodiment (as shown in FIGS. 1-10) of the present invention, the splatter cover apparatus 100 is comprised of a two-piece, splatter cover 110 (which is nicknamed the "simple split cover"), a first securing device 160*a*,160*b*, and a second securing device 180*a*,180*b*.

The two-piece, splatter cover 110 is comprised of a first or door cover section 120 and a second or back wall cover section 140, and is dimensioned and configured as a one-piece unit, when the first cover section 120 and second cover section 140 come together or toward one another for use, to sufficiently and effectively cover foods and drinks during use (heating or defrosting) such that food and drink splatters are minimized or prevented inside a microwave oven OV. In this non-limiting, first embodiment, the first cover section 120 and second cover section 140 are substantially or exactly the same as one another.

The first or door cover section 120 preferably has both a first cover section height 120*h* and a first cover section diameter 120*d*. As a non-limiting example, the first cover section 120 preferably includes a top 122 having a perimeter 124, an engagement surface or area 126, and a plurality of vent holes or apertures 127, and also includes a sidewall 128 extending downward from the perimeter 124 of the top 122 and a flange 129 extending outward from the bottom of the sidewall 128. The top 122 has a semi-circle or half-circle configuration.

The first cover section 120 is capable of being detachably attached, secured or mounted in proximity or the vicinity of a first side or wall, such as the door DR (or a side or wall adjacent to the door DR), of the interior INT of the microwave oven OV by the first securing device 160*a* at a securing height with respect to a bottom side BS of the interior INT of the microwave oven OV.

The second or back wall cover section 140 preferably has both a second cover section height 140*h* and a second cover section diameter 140*d*. As a non-limiting example, the second cover section 140 includes a top 142 having a perimeter 144, an engagement surface or area 146, and a plurality of vent holes or apertures 147, and also includes a sidewall 148 extending downward from the perimeter 144 of the top 142 and a flange 149 extending outward from the bottom of the sidewall 148. The top 142 has a semi-circle or half-circle configuration such that the top 122 and top 142 form a circle configuration when they come together or toward one another to operationally form the two-piece, splatter cover 110.

The second cover section 140 is capable of being detachably attached, secured or mounted in proximity or the vicinity of a second side or wall, such as the back wall BW (or a side or wall adjacent to the back wall BW and also opposite to the side or wall that is adjacent to the door DR), of the interior INT of the microwave oven OV by the second securing device 180*a* at a securing height with respect to the bottom side BS of the interior INT of the microwave oven OV.

As a non-limiting example of securing devices and as shown in FIGS. 1-7, each of the first securing device 160*a* and second securing device 180*a* is a suction-type securing device. Preferably, the first securing device 160*a* and second securing device 180*a* are substantially or exactly the same as one another.

The first securing device 160*a* comprises a first or door securing portion 162*a*, a second or first cover section securing portion 164*a*, and a body 166*a* disposed between or among the securing portions 162*a* and 164*a*. The first securing portion 162*a* is at least one suction 162*a* (preferably a pair of suctions 162*a*), and the second securing portion 164*a* is a securing surface 164*a* (preferably a curved, securing surface 164*a*) that is attached, secured or mounted to a corresponding portion of the first cover section 120 by any method, device or feature known to one of ordinary skill in the art, such as, but not limited to, adhesive. The pair of suctions 162*a* permit the first securing device 160*a* to be adjustable vertically (upward or downward relative to a first securing position) and also laterally (rightward or leftward relative to the first securing position) along the door DR (or a side or wall adjacent to the door).

The second securing device 180*a* comprises a first or back wall securing portion 182*a*, a second or second cover section securing portion 184*a*, and a body 186*a* disposed between or among the securing portions 182*a* and 184*a*. The first securing portion 182*a* is at least one suction 182*a* (preferably a pair of suctions 182*a*), and the second securing portion 184*a* is a securing surface 184*a* (preferably a curved, securing surface 184*a*) that is attached, secured or mounted to a corresponding portion of the second cover section 140 by any method, device or feature known to one of ordinary skill in the art, such as, but not limited to, adhesive. The pair of suctions 182*a* permit the second securing device 180*a* to be adjustable vertically (upward or downward relative to a first securing position) and also laterally (rightward or leftward relative to the first securing position) along the back wall BW (or a side or wall adjacent to the back wall BW and also opposite to the side or wall that is adjacent to the door DR).

As another non-limiting example of securing devices and as shown in FIGS. 8-10 and 20, each of the first securing device 160*b* and second securing device 180*b* is a suction-type securing device. Preferably, the first securing device 160*b* and second securing device 180*b* are substantially or exactly the same as one another.

Figure 9:
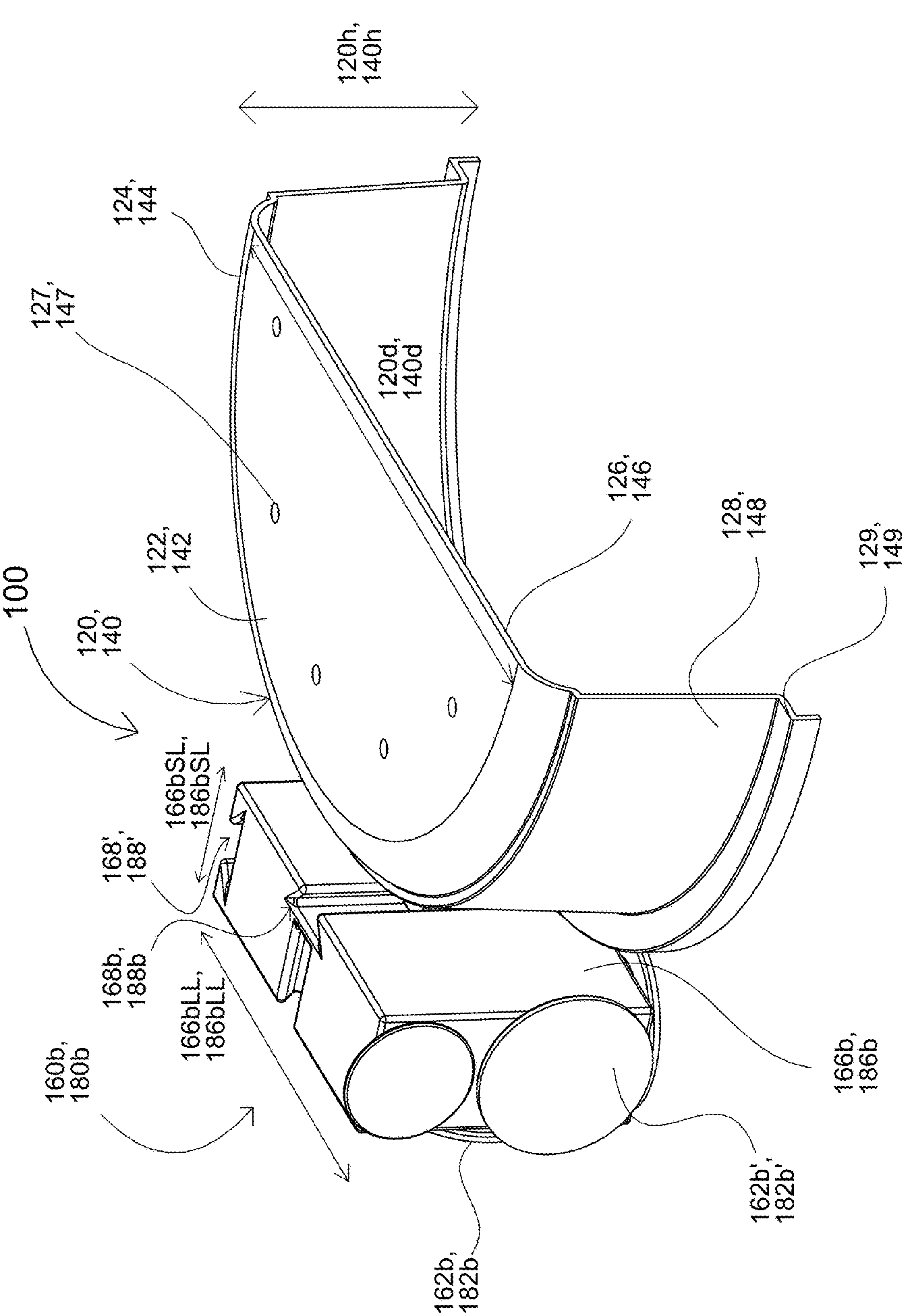
FIG. 9 is a perspective, front, top view of the one cover section of FIG. 2, with another different securing device (in a first securing orientation)
Figure 10:
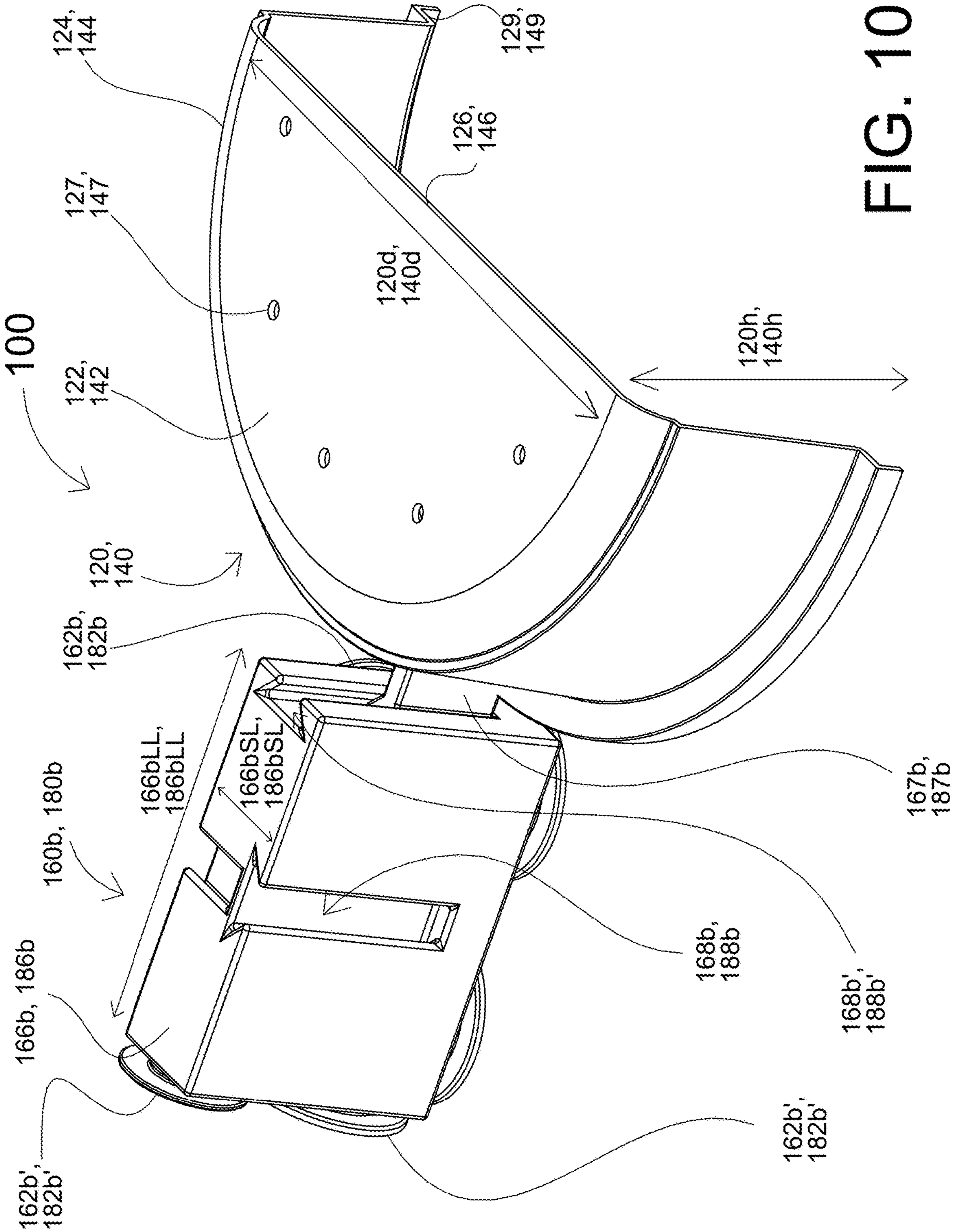
FIG. 10 is a perspective, front, top view of the one cover section of FIG. 2, with the different securing device of FIG. 9 (in a second securing orientation)

The first securing device 160*b* comprises a first or door securing portion 162*b*, a second or first cover section securing portion 164*b*, and a body 166*b* disposed between or among the securing portions 162*b* and 164*b*. The first securing portion 162*b* is two sets of at least one suction 162*b*,162*b*' (preferably two pairs of suctions 162*b*,162*b*'), and the second securing portion 164*b* is two combinations of a tail 167*b* and vertical slot 168*b*,168*b*'. Each of the pair of suctions 162*b*,162*b*' permit the first securing device 160*b* to be adjustable vertically (upward or downward relative to a first securing position) and also laterally (rightward or leftward relative to the first securing position) along the door DR (or a side or wall adjacent to the door DR). The first pair of suctions 162*b* is positioned at one end of a shorter length 166*b*SL (depending on the orientation of the first securing device 160*b* relative to the door DR) of the body 166*b* (as shown in FIG. 9) such that the door DR and first cover section 120 will be closer to one another to accommodate, for example, a larger food container CONT. The second pairs of suctions 162*b*' is positioned at one end of a longer length 166*b*LL (depending on the orientation of the first securing device 160*b* relative to the door DR) of the body 166*b* (as shown in FIG. 10) such that the door DR and first cover section 120 will be further away from one another to accommodate, for example, a smaller food container CONT. The tail 167*b* is attached, secured or mounted to a corresponding portion of the first cover section 120 by any method, device or feature known to one of ordinary skill in the art, such as, but not limited to, adhesive or being manufactured with the first cover section 120. The vertical slot 168*b* is dimensioned and configured to receive and detachably retain the tail 167*b*, and is positioned at the other end of the shorter length 166*b*SL of the body 166*b* (as shown in FIG. 9). The vertical slot 168*b*' is dimensioned and configured to receive and detachably retain the tail 167*b*, and is positioned at the other end of the longer length 166*b*LL of the body 166*b* (as shown in FIG. 10).

The second securing device 180*b* comprises a first or back wall securing portion 182*b*, a second or second cover section securing portion 184*b*, and a body 186*b* disposed between or among the securing portions 182*b* and 184*b*. The first securing portion 182*b* is two sets of at least one suction 182*b*,182*b*' (preferably two pairs of suctions 182*b*,182*b*'), and the second securing portion 184*b* is two combinations of a tail 187*b* and vertical slot 188*b*,188*b*'. Each of the pair of suctions 182*b*,182*b*' permit the second securing device 180*b* to be adjustable vertically (upward or downward relative to a first securing position) and also laterally (rightward or leftward relative to the first securing position) along the back wall BW (or a side or wall adjacent to the back wall BW). The first pair of suctions 182*b* is positioned at one end of a shorter length 186*b*SL (depending on the orientation of the first securing device 180*b* relative to the back wall BW) of the body 186*b* (as shown in FIG. 9) such that the back wall BW and second cover section 140 will be closer to one another to accommodate, for example, a larger food container CONT. The second pairs of suctions 182*b*' is positioned at one end of a longer length 186*b*LL (depending on the orientation of the second securing device 180*b* relative to the back wall BW) of the body 186*b* (as shown in FIG. 10) such that the back wall BW and second cover section 140 will be further away from one another to accommodate, for example, a smaller food container CONT. The tail 187*b* is attached, secured or mounted to a corresponding portion of the second cover section 140 by any method, device or feature known to one of ordinary skill in the art, such as, but not limited to, adhesive or being manufactured with the second cover section 140. The vertical slot 188*b* is dimensioned and configured to receive and detachably retain the tail 187*b*, and is positioned at the other end of the shorter length 186*b*SL of the body 186*b* (as shown in FIG. 9). The vertical slot 188*b*' is dimensioned and configured to receive and detachably retain the tail 187*b*, and is positioned at the other end of the longer length 186*b*LL of the body 186*b* (as shown in FIG. 10).

Figure 11:
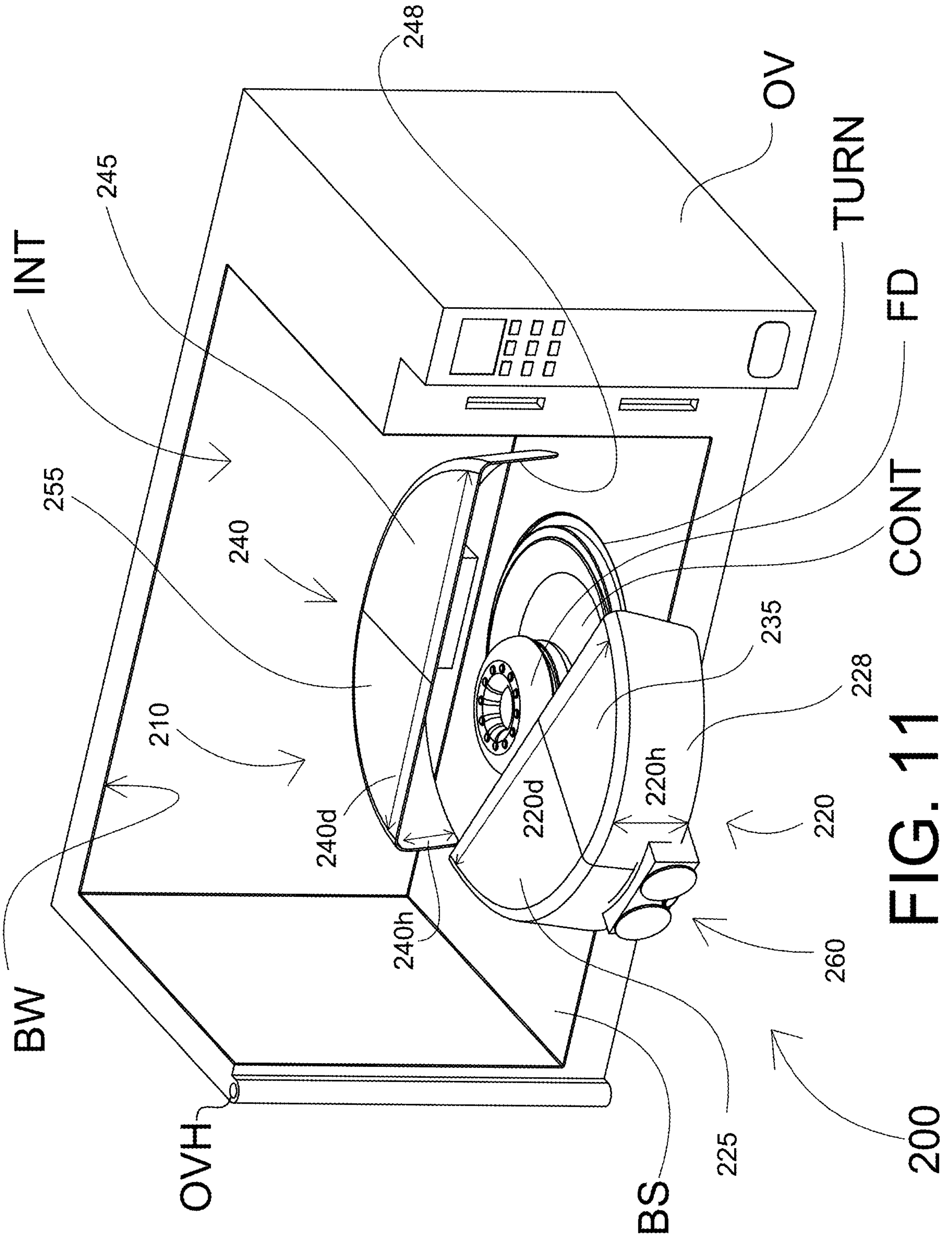
FIG. 11 is an environmental, perspective view of a second embodiment of a splatter cover apparatus according to the present invention, wherein the apparatus includes a two-piece splatter cover and securing devices, and wherein the door and top of a microwave oven have been removed for better viewing.
Figure 12:
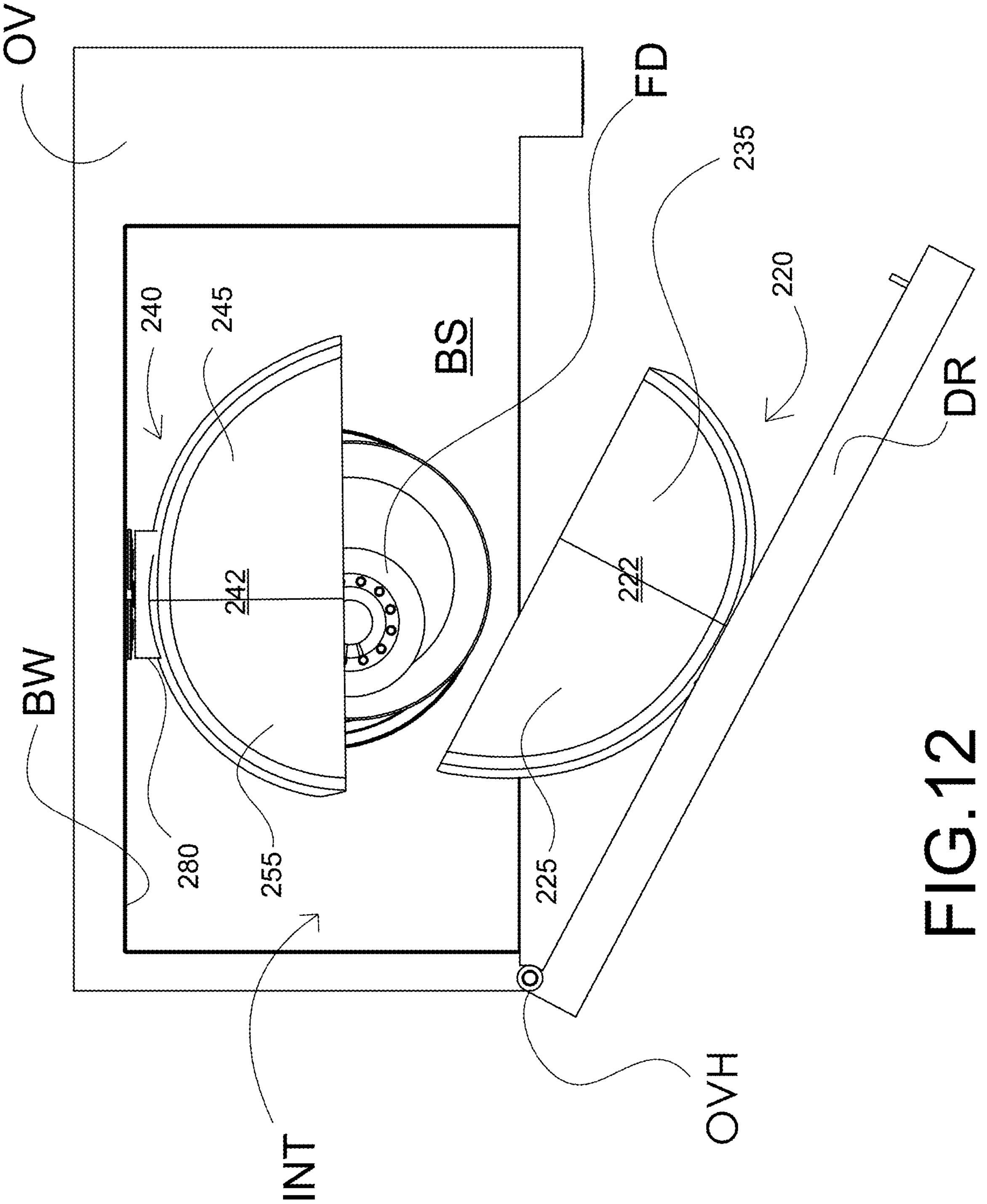
FIG. 12 is an environmental, top view of the splatter cover apparatus of FIG. 11, wherein the door of the microwave oven is in an open position, and wherein the top of the microwave oven has been removed for better viewing.
Figure 13:
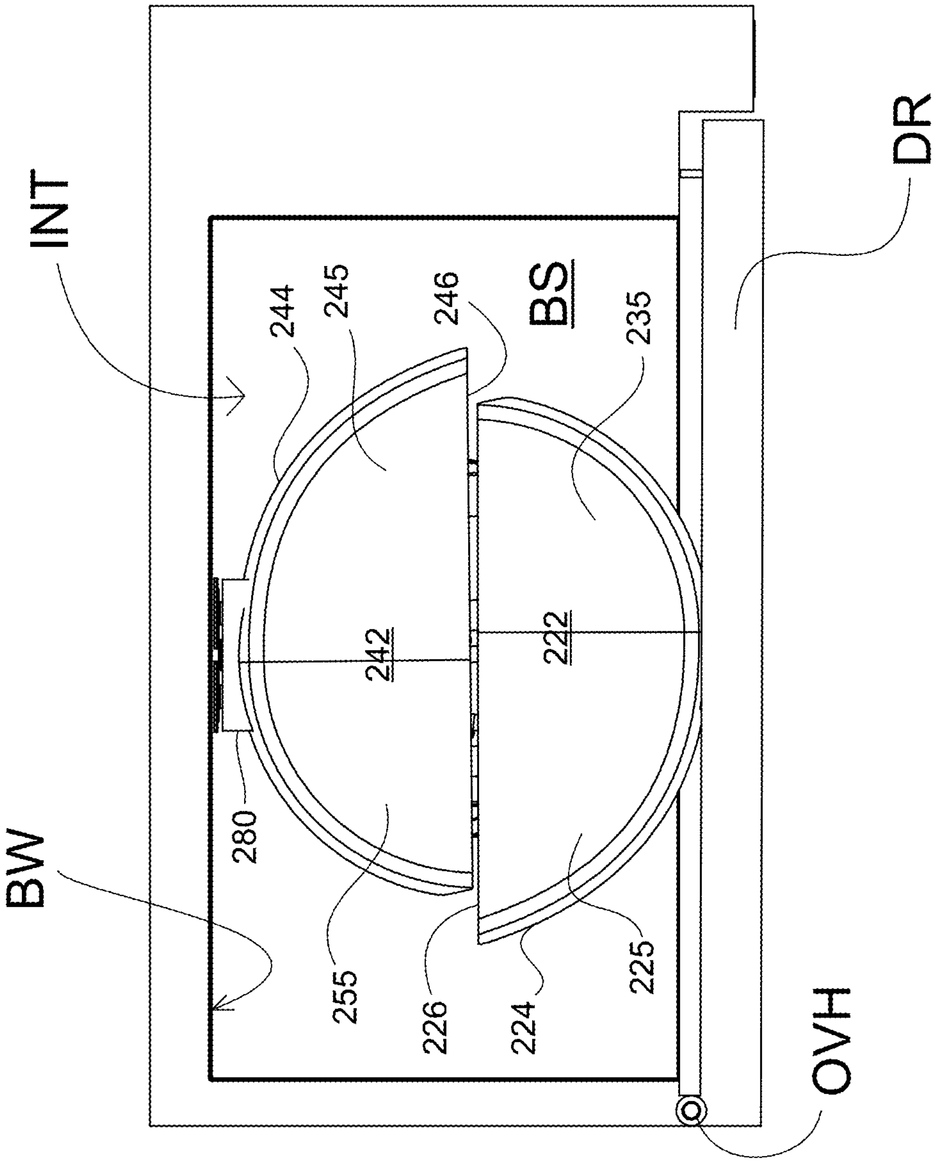
FIG. 13 is an environmental, top view of the splatter cover apparatus of FIG. 11, wherein the door of the microwave oven is in a closed position for use or operation, and wherein the top of the microwave oven has been removed for better viewing.

In a non-limiting, second embodiment (as shown in FIGS. 11-13) of the present invention, the splatter cover apparatus 200 is comprised of a two-piece, splatter cover 210 (which is nicknamed the "Nautilus cover"), a first securing device 260, and a second securing device 280.

The two-piece, splatter cover 210 is comprised of a first or door cover section 220 and a second or back wall cover section 240, and is dimensioned and configured as a one-piece unit, when the first cover section 220 and second cover section 240 come together or toward one another for use, to sufficiently and effectively cover foods and drinks during use (heating or defrosting) such that food and drink splatters are minimized or prevented inside a microwave oven OV. In this non-limiting, second embodiment, the first cover section 220 and second cover section 240 are substantially or exactly the same as one another.

Further, in this non-limiting, second embodiment, the two-piece, splatter cover 210 may comprise at least one, preferably, both, of the two cover sections 220,240 comprising a larger portion 225,245 and a smaller portion 235,255, respectively, in order to allow clearance of the splatter cover 210 past the microwave oven opening or entry when the door DR is closed and, alternatively, opened. Preferably, as best shown in FIGS. 11 and 13, the smaller portion 235 of the first or door cover section 220 is positioned about the microwave oven opening or entry while the larger portion 225 of the first or door cover section 220 is positioned about the microwave oven hinge OVH. Alternatively, the smaller portion 235 of the first or door cover section 220 may be radiused or angled in order to allow clearance of the first or door cover section 220 past the microwave oven opening or entry. This design allows the two sections 220,240 to fit into a large microwave oven and also a small microwave oven.

The first cover section 220 preferably has both a first cover section height 220*h* and a first cover section diameter 220*d*. As a non-limiting example, the first cover section 220 preferably includes a top 222 having a perimeter 224 and an engagement surface or area 226, and also includes a sidewall 228 extending downward from the perimeter 224 of the top 222. The top 222 has a general semi-circle or general half-circle configuration.

The first cover section 220 is capable of being detachably attached, secured or mounted in proximity or the vicinity of a first side or wall, such as the door DR (or a side or wall adjacent to the door DR), of the interior INT of the microwave oven OV by the first securing device 260 at a securing height with respect to a bottom side BS of the interior INT of the microwave oven OV.

The second or back wall cover section 240 preferably has both a second cover section height 240*h* and a second cover section diameter 240*d*. As a non-limiting example, the second cover section 240 includes a top 242 having a perimeter 244 and an engagement surface or area 246, and also includes a sidewall 248 extending downward from the perimeter 244 of the top 242. The top 242 has a general semi-circle or general half-circle configuration such that the top 222 and top 242 form a general circle configuration when they come together or toward one another to operationally form the two-piece, splatter cover 210.

The second cover section 240 is capable of being detachably attached, secured or mounted in proximity or the vicinity of a second side or wall, such as the back wall BW (or a side or wall adjacent to the back wall BW and also opposite to the side or wall that is adjacent to the door DR), of the interior INT of the microwave oven OV by the second securing device 280 at a securing height with respect to the bottom side BS of the interior INT of the microwave oven OV.

As shown in FIG. 13, when the first cover section 220 and second cover section 240 come together or toward one another to operationally form the two-piece, splatter cover 210, the engagement surface or area 226 of the first cover section 220 and the engagement surface or area 246 of the second cover section 240 may be separated by a small distance and/or also may be offset with one another that creates a vent operationally while still minimizing or preventing splatters.

Figure 14:
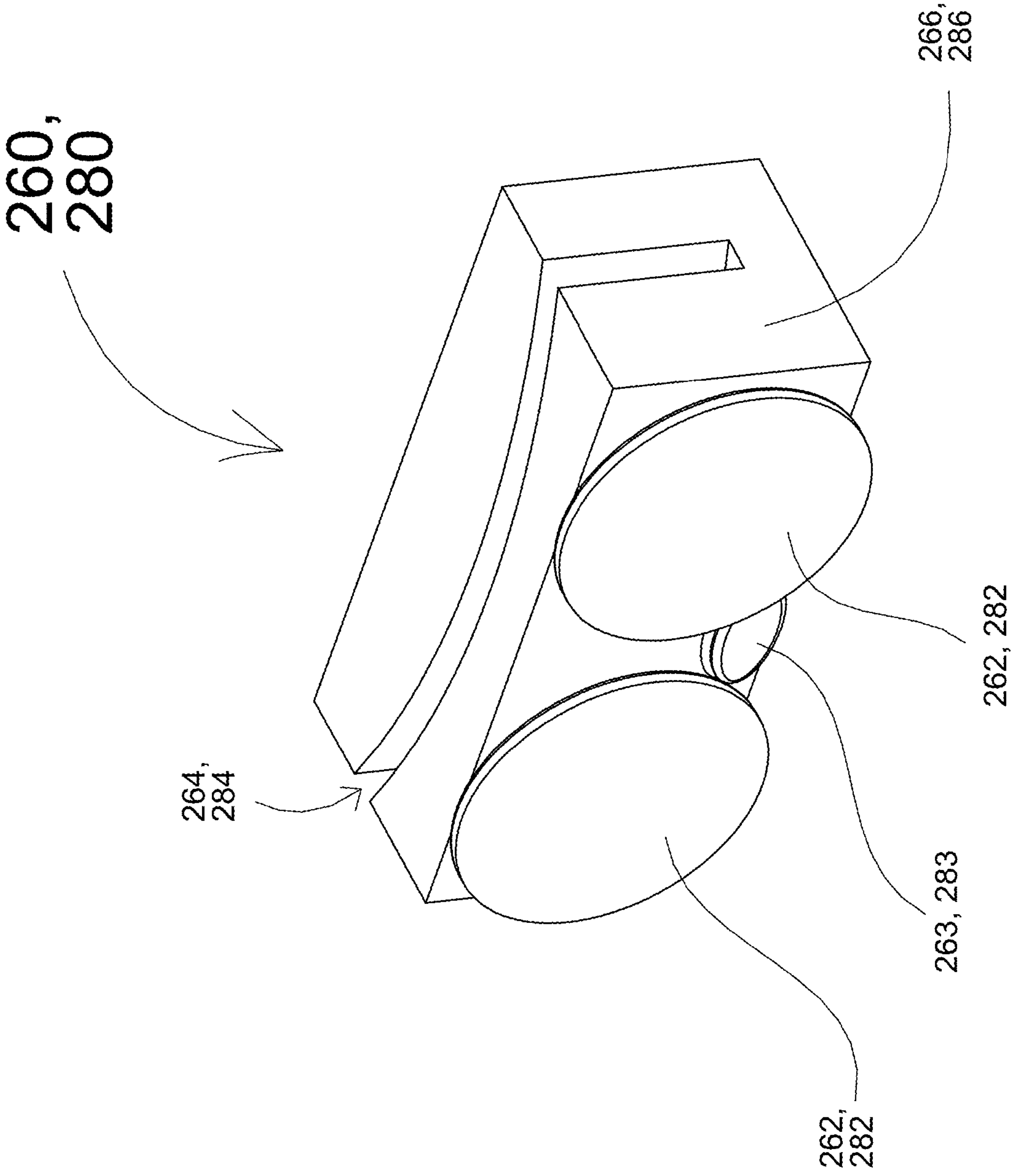
FIG. 14 is a perspective view of a non-limiting example of a securing device.

As a non-limiting example of securing devices and as best shown in FIG. 14, each of the first securing device 260 and second securing device 280 is a suction-type securing device having at least one securing slot. Preferably, the first securing device 260 and second securing device 280 are substantially or exactly the same as one another.

The first securing device 260 comprises a first or door securing portion 262, a second or first cover section securing portion 264, and a body 266 disposed between or among the securing portions 262 and 264. The first securing portion 262 includes at least one suction 262 (preferably a pair of suctions 262) and, preferably, at least one magnet 263, and the second securing portion 264 is at least one securing slot 264 that is dimensioned and configured for receiving and securing a corresponding portion of the first cover section 220. The pair of suctions 262 and, preferably, at least one magnet 263 permit the first securing device 260 to be adjustable vertically (upward or downward relative to a first securing position) and also laterally (rightward or leftward relative to the first securing position) along the door DR (or a side or wall adjacent to the door).

The second securing device 280 comprises a first or back wall securing portion 282, a second or second cover section securing portion 284, and a body 286 disposed between or among the securing portions 282 and 284. The first securing portion 282 is at least one suction 282 (preferably a pair of suctions 282) and, preferably, at least one magnet 283, and the second securing portion 284 is at least one securing slot 284 that is dimensioned and configured for receiving and securing a corresponding portion of the second cover section 240. The pair of suctions 282 and, preferably, at least one magnet 283 permit the second securing device 280 to be adjustable vertically (upward or downward relative to a first securing position) and also laterally (rightward or leftward relative to the first securing position) along the back wall BW (or a side or wall adjacent to the back wall BW and also opposite to the side or wall that is adjacent to the door DR).

As other non-limiting examples of securing devices and as shown in FIGS. 1-20, each of the first securing device 160,260,260',260'',260''',260'''', 360,460,560 and second securing device 280,280',280'',280''',280'''',380,480,580 may be any securing device according to the present invention, any similar securing device known to one of ordinary skill in the art, and any combination thereof. Each pair of the first securing device 160,260,260',260'',260''',260'''', 360, 460,560 and second securing device 280,280',280'',280''', 280'''',380,480,580 may be a pair of substantially similar or exactly the same securing device or a mix and match combination of securing devices.

Figure 15A:
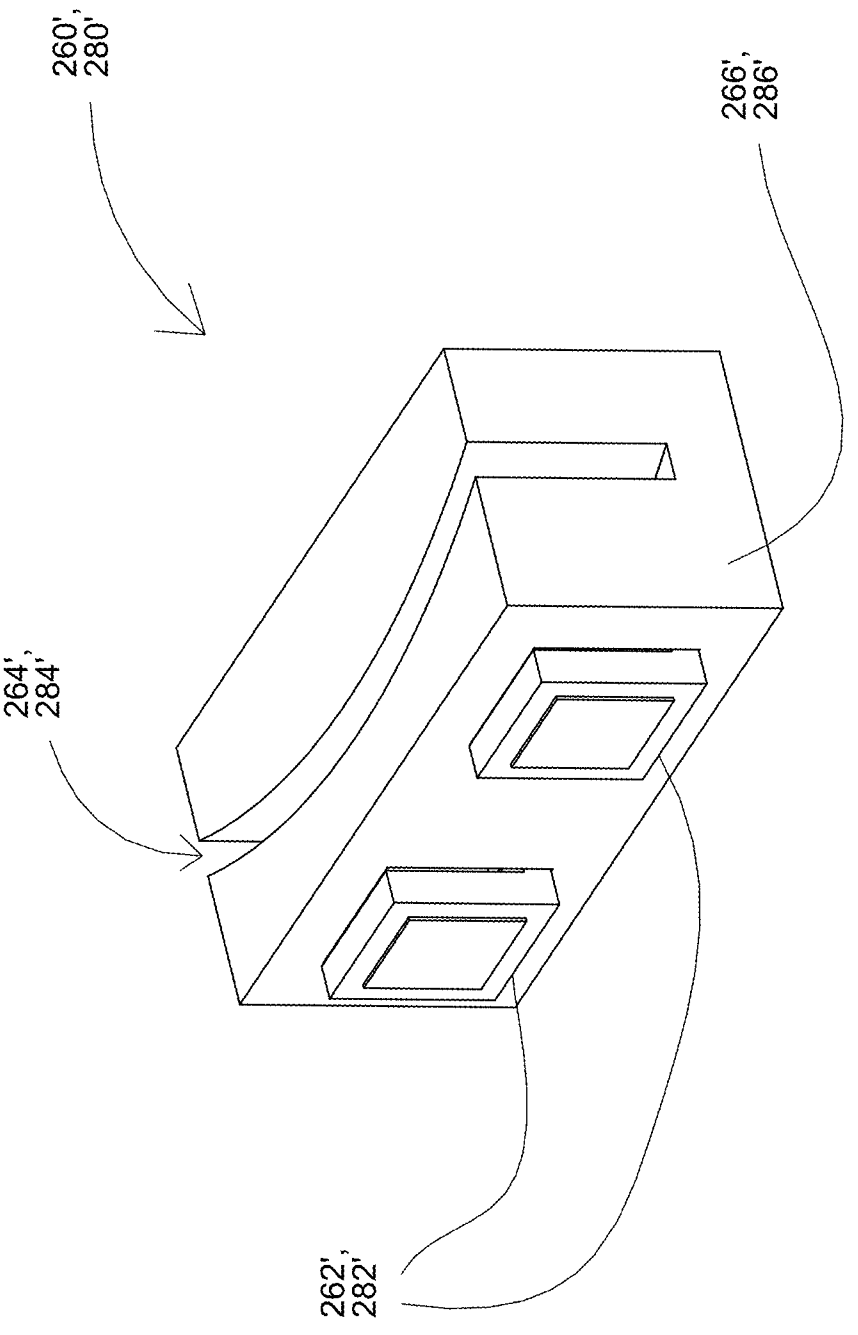
FIG. 15*a* is a perspective view of another non-limiting example of a securing device.
Figure 15B:
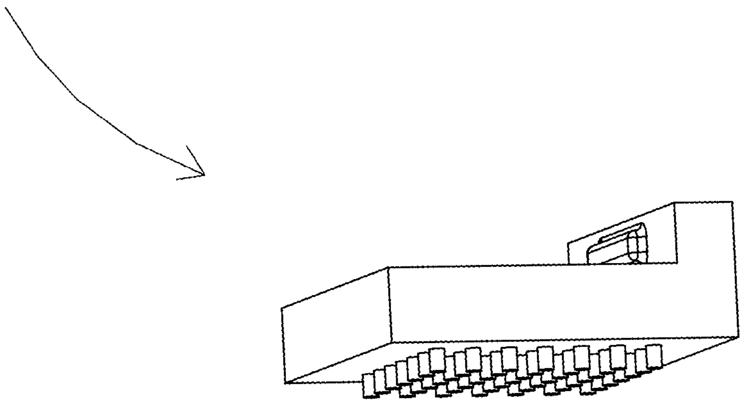
FIGS. 15*b*-15*e* are perspective views of different replaceable securing components or features of the securing device of FIG. 15*a;*
Figure 15C:
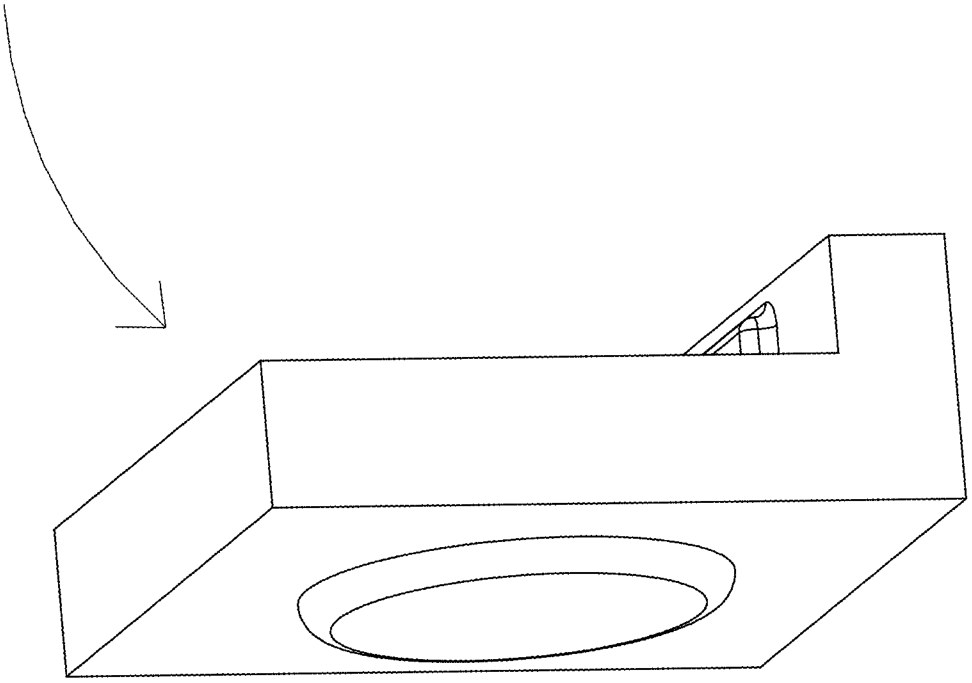
Figure 15D:
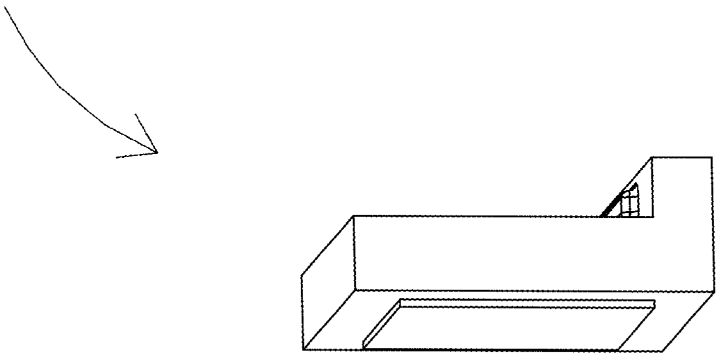
Figure 15E:
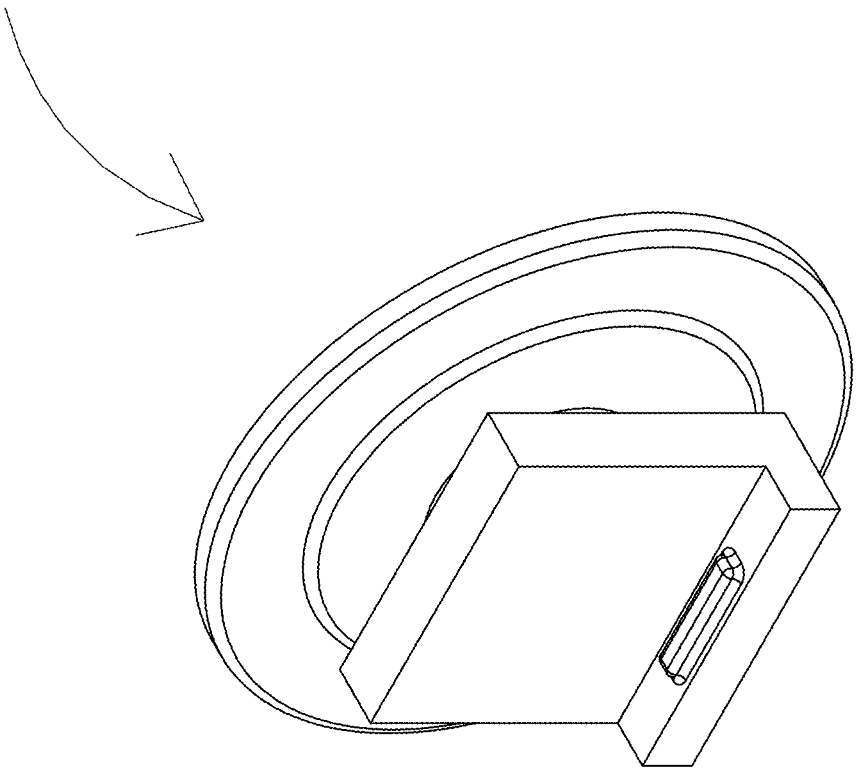

FIG. 15*a* shows a cover holder device 260',280' (similar to 260,280) using detachable "L-shaped" mounting clips as a non-limiting example of both the first securing device 260' and second securing device 280'. FIGS. 15*b*-15*e* show non-limiting examples of detachable "L-shaped" mounting clips. The first securing device 260' comprises a first or door securing portion 262', a second or first cover section securing portion 264' (preferably substantially or exactly the same as 264), and a body 266' disposed between or among the securing portions 262' and 264'. The second securing device 280' comprises a first or back wall securing portion 282', a second or second cover section securing portion 284' (preferably substantially or exactly the same as 284), and a body 286' disposed between or among the securing portions 282' and 284'. Each of the securing portion 262' and securing portion 282' is at least one (preferably two) detachable "L-shaped" mounting clip, such as, but not limited to, a mounting clip comprising hook and look fasteners (to engage with hook and look fasteners positioned on the applicable microwave oven door DR or wall; shown in FIG. 15*b*), a mounting clip comprising at least one magnet (to engage with the applicable microwave oven door DR or wall; shown in FIG. 15*c*), a mounting clip comprising at least one sticker (to engage with the applicable microwave oven door DR or wall; shown in FIG. 15*d*), and a mounting clip comprising at least one suction cup (to engage with the applicable microwave oven door DR or wall; shown in FIG. 15*e*).

Figure 16:
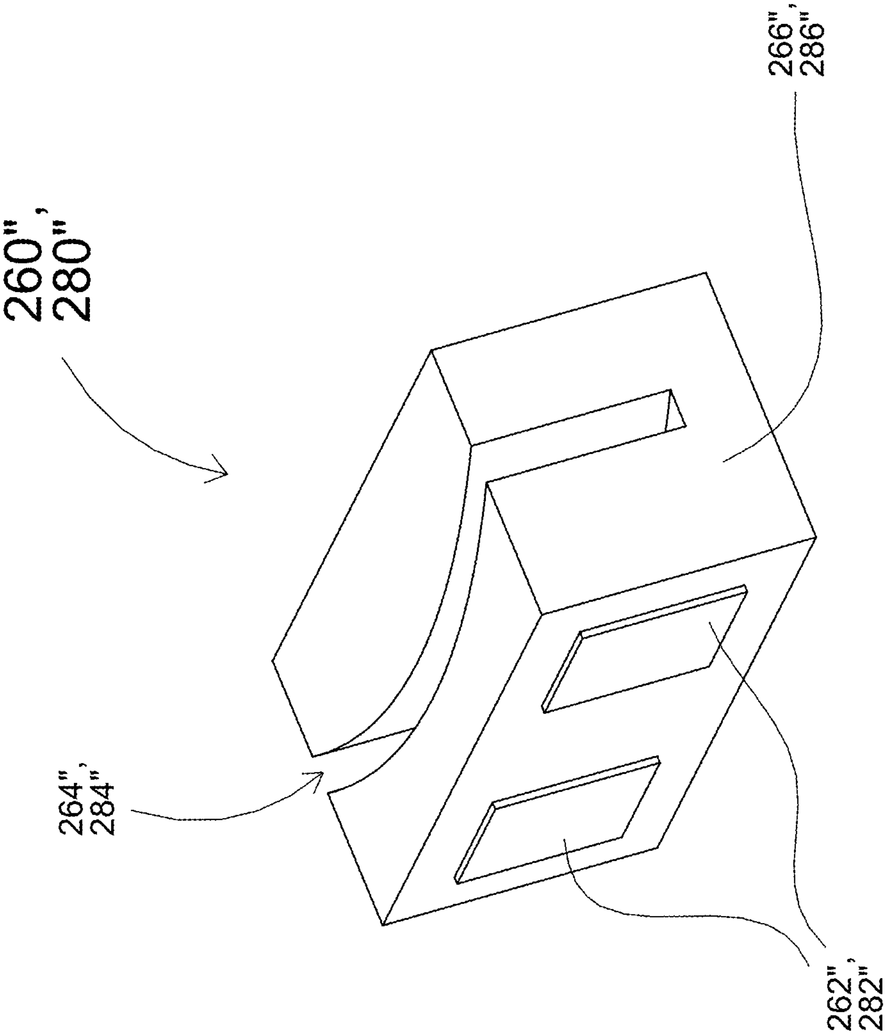
FIG. 16 is a perspective view of a further non-limiting example of a securing device.

FIG. 16 shows a cover holder device 260",280" (similar to 260,260', 280,280') using at least one sticker as a non-limiting example of both the first securing device 260" and second securing device 280". The first securing device 260" comprises a first or door securing portion 262", a second or first cover section securing portion 264" (preferably substantially or exactly the same as 264,264'), and a body 266" disposed between or among the securing portions 262" and 264". The second securing device 280" comprises a first or back wall securing portion 282", a second or second cover section securing portion 284" (preferably substantially or exactly the same as 284,284'), and a body 286" disposed between or among the securing portions 282" and 284". Each of the securing portion 262" and securing portion 282" is at least one (preferably two) sticker.

Figure 17:
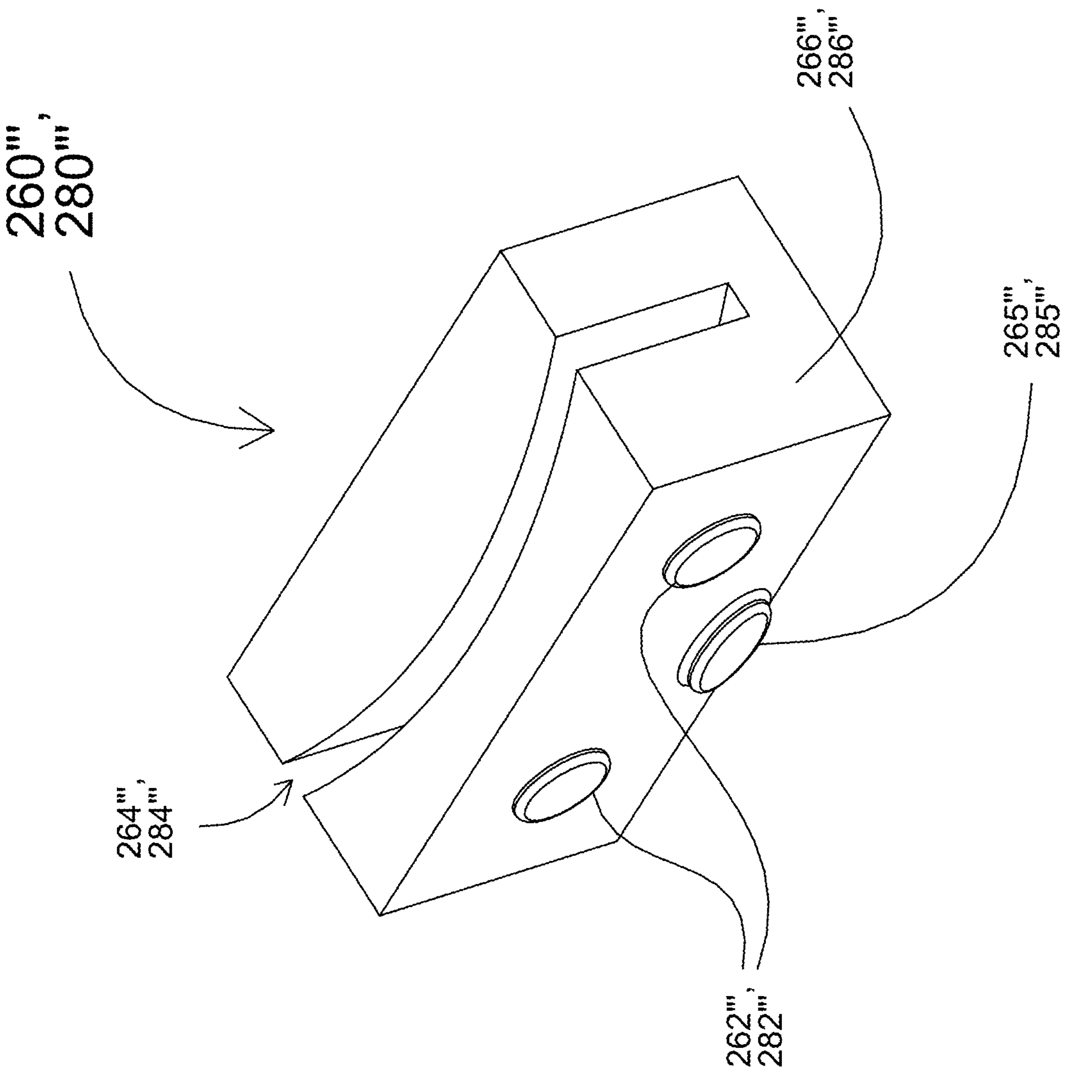
FIG. 17 is a perspective view of another non-limiting example of a securing device.

FIG. 17 shows a cover holder device 260''',280''' (similar to 260,260',260",280, 280',280") using at least one magnet as a non-limiting example of both the first securing device 260''' and second securing device 280'''. The first securing device 260''' comprises a first or door securing portion 262''', a second or first cover section securing portion 264''' (preferably substantially or exactly the same as 264,264',264"), and a body 266''' disposed between or among the securing portions 262''' and 264'''. The second securing device 280''' comprises a first or back wall securing portion 282''', a second or second cover section securing portion 284''' (preferably substantially or exactly the same as 284,284',284"), and a body 286''' disposed between or among the securing portions 282''' and 284'''. Each of the securing portion 262''' and securing portion 282''' is at least one (preferably two) magnet. Each cover holder device 260''',280''' may also include at least one bumper rest 265''',285''' that helps to keep the cover holder device 260''',280''' from drooping when the cover holder device 260''',280''' is mounted to the applicable microwave oven door DR or wall.

Figure 18:
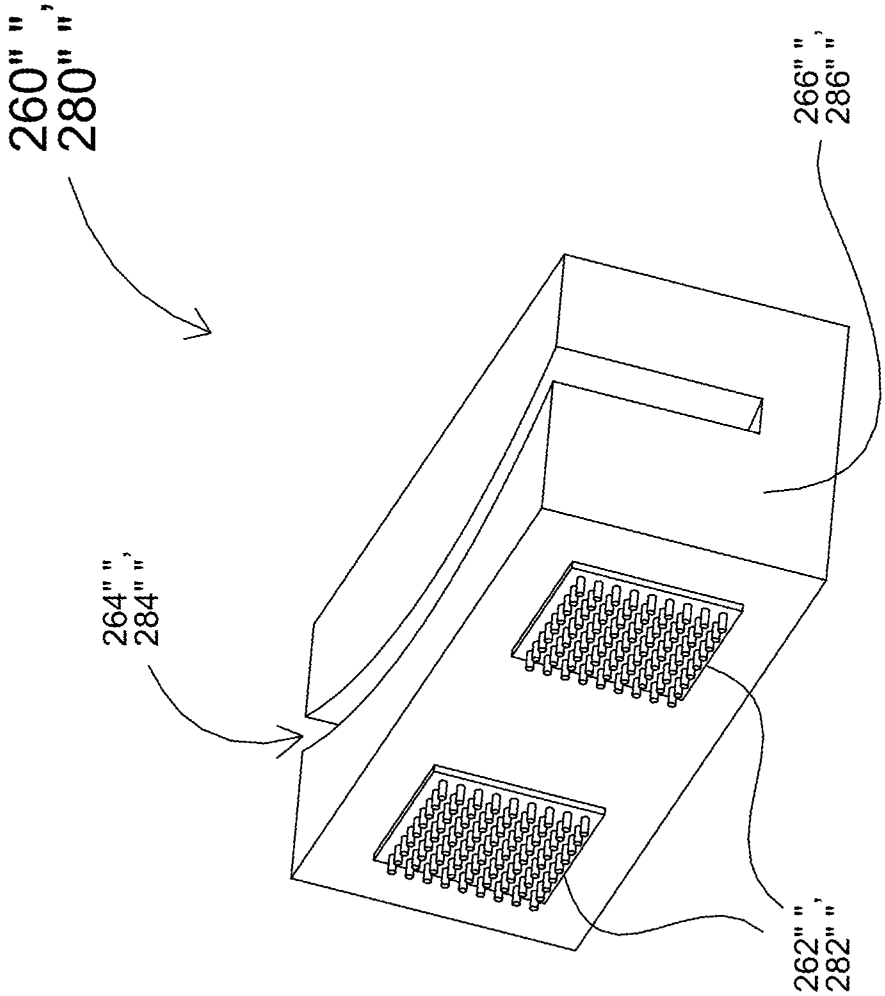
FIG. 18 is a perspective view of a further non-limiting example of a securing device.

FIG. 18 shows a cover holder device 260"",280"" (similar to 260,260', 260",260''', 280,280',280",280''') using at least one hook and loop fastener arrangement as a non-limiting example of both the first securing device 260"" and second securing device 280"". The first securing device 260"" comprises a first or door securing portion 262"", a second or first cover section securing portion 264"" (preferably substantially or exactly the same as 264,264',264", 264'''), and a body 266"" disposed between or among the securing portions 262"" and 264"". The second securing device 280"" comprises a first or back wall securing portion 282"", a second or second cover section securing portion 284"" (preferably substantially or exactly the same as 284,284', 284",284'''), and a body 286"" disposed between or among the securing portions 282"" and 284"". Each of the securing portion 262"" and securing portion 282"" is at least one (preferably two) arrangement of hook and loop fasteners.

Figure 19:
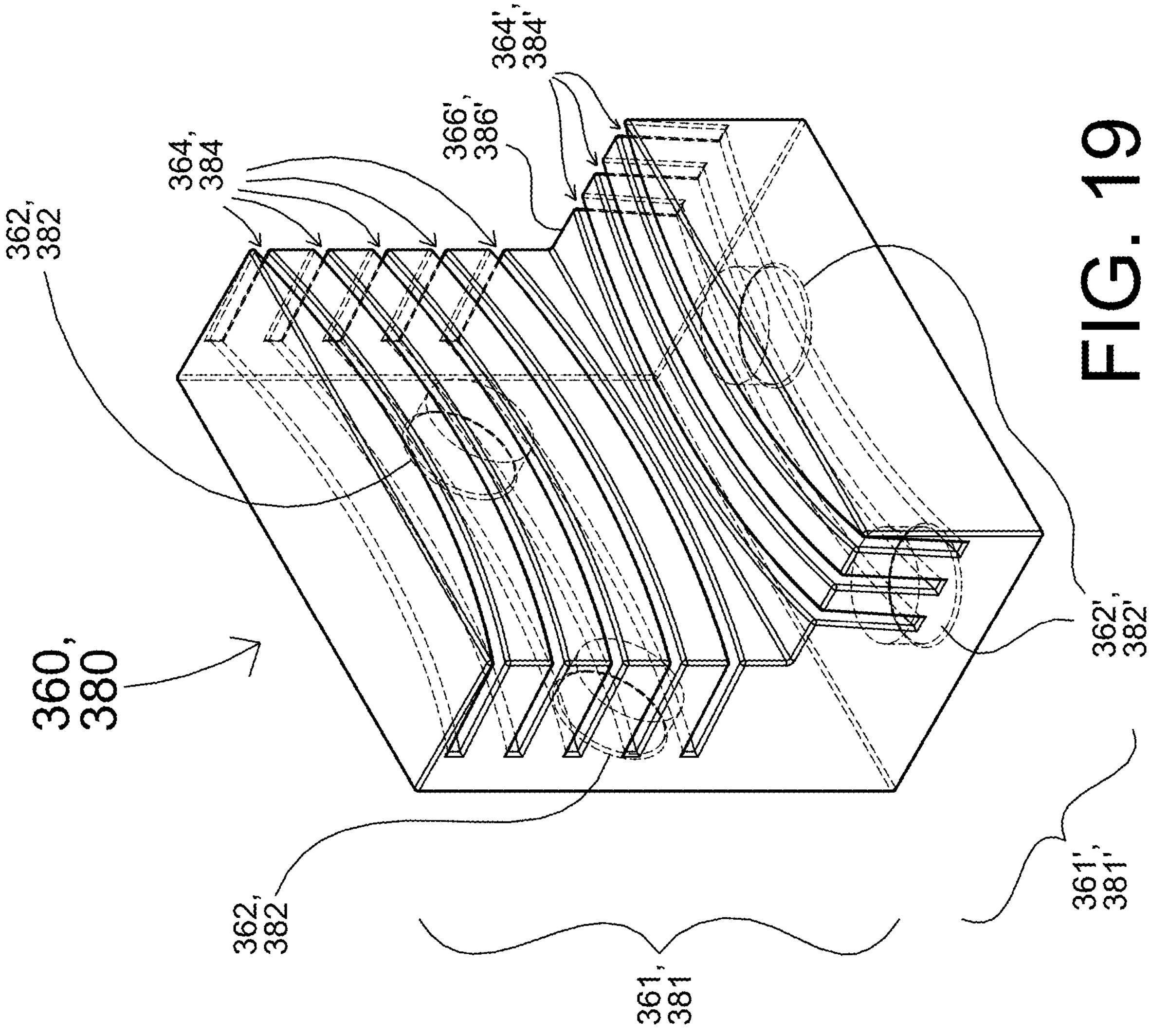
FIG. 19 is a perspective view of another non-limiting example of a securing device.

As another non-limiting example of securing devices and as best shown in FIG. 19, each of the first securing device 360 and second securing device 380 is an "L-shaped" securing device having a plurality of securing slots. Preferably, the first securing device 360 and second securing device 380 are substantially or exactly the same as one another.

The first securing device 360 comprises an "L-shaped" configuration having a longer portion 361 and a shorter portion 361'. Each of the longer portion 361 and shorter portion 361' has a first or door securing portion 362,362', a second or first cover section securing portion 364,364', and a body 366,366' disposed between or among the securing portions 362,362' and 364,364', respectively. The first securing portion 362,362' includes at least one suction cup 362,362' (preferably a pair of suction cups 362,362'; not shown but would be located at the applicable locations), and the second securing portion 364,364' is a plurality of securing slots 364,364' that is dimensioned and configured for receiving and securing a corresponding portion of the first cover section 120,220, and other first cover sections. The at least one suction cup 362,362' permits the first securing device 360 to be adjustable vertically (upward or downward relative to a first securing position) and also laterally (rightward or leftward relative to the first securing position) along the door DR (or a side or wall adjacent to the door).

When the first securing device 360 is oriented such that the longer portion 361 (compared to the shorter portion 361') of the first securing device 360 is positioned closer to the door DR, the door DR and first cover section 120,220, and other first cover sections will be generally closer to one another, due to presence of lesser number of securing slots 364', to accommodate, for example, a larger food container CONT. Alternatively, when the first securing device 360 is oriented such that the shorter portion 361' (compared to the longer portion 361) of the first securing device 360 is positioned closer to the door DR, the door DR and first cover section 120,220, and other first cover sections will be generally farther to one another, due to presence of greater number of securing slots 364, to accommodate, for example, a smaller food container CONT.

The second securing device 380 comprises an "L-shaped" configuration having a longer portion 381 and a shorter portion 381'. Each of the longer portion 381 and shorter portion 381' has a first or back wall securing portion 382,382', a second or second cover section securing portion 384,384', and a body 386,386' disposed between or among the securing portions 382,382' and 384,384', respectively. The first securing portion 382,382' includes at least one suction cup 382,382' (preferably a pair of magnets 382,382'; not shown but would be located at the applicable locations), and the second securing portion 384,384' is a plurality of securing slots 384,384' that is dimensioned and configured for receiving and securing a corresponding portion of the second cover section 140,240, and other second cover sections. The at least suction cup 382,382' permits the second securing device 380 to be adjustable vertically (upward or downward relative to a first securing position) and also laterally (rightward or leftward relative to the first securing position) along the back wall BW (or a side or wall adjacent to the back wall BW).

When the second securing device 380 is oriented such that the longer portion 381 (compared to the shorter portion 381') of the second securing device 380 is positioned closer to the back wall BW, the back wall BW and second cover section 140,240, and other second cover sections will be generally closer to one another, due to presence of lesser number of securing slots 384', to accommodate, for example, a larger food container CONT. Alternatively, when the second securing device 380 is oriented such that the shorter portion 381' (compared to the longer portion 381) of the second securing device 380 is positioned closer to the back wall BW, the back wall BW and second cover section 140,240, and other second cover sections will be generally farther to one another, due to presence of greater number of securing slots 384, to accommodate, for example, a smaller food container CONT.

Figure 8:
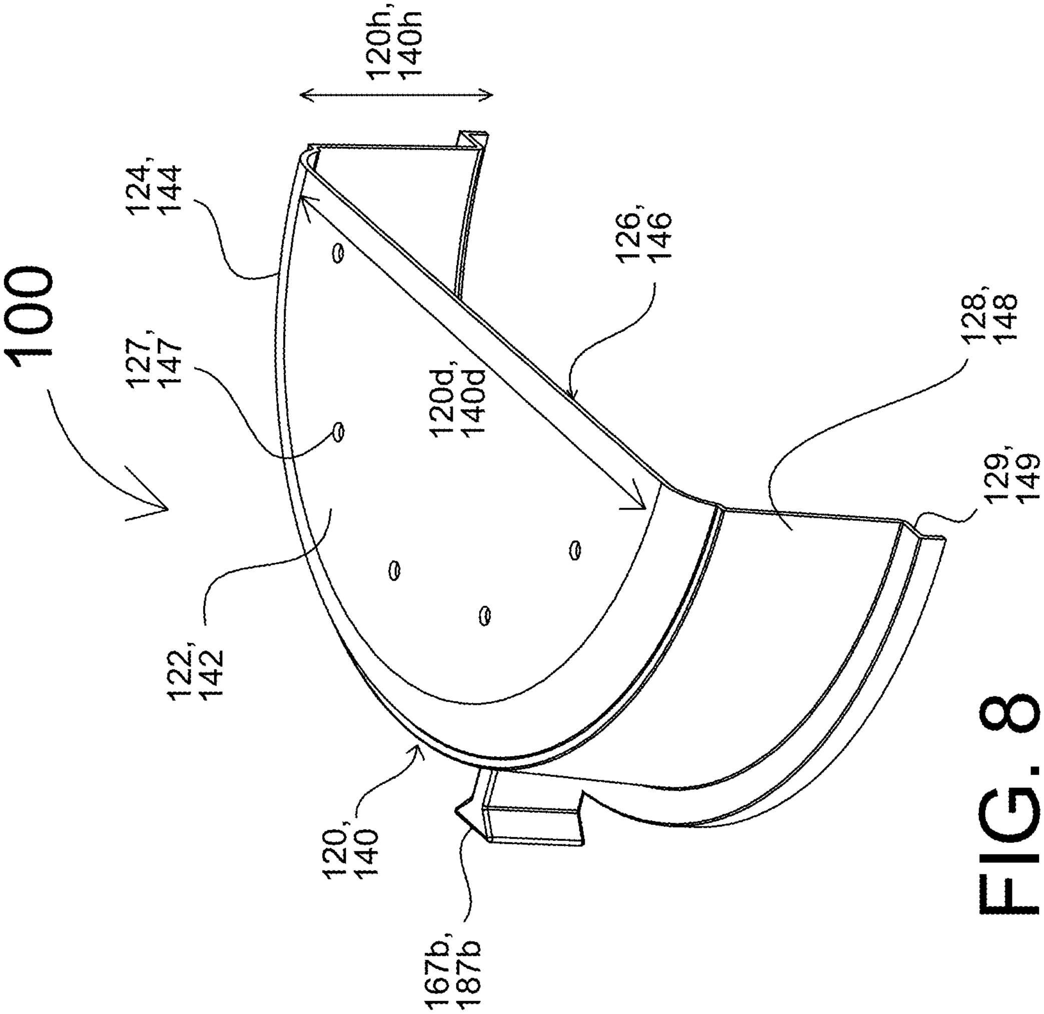
FIG. 8 is a perspective, front, top view of the one cover section of FIG. 2, with a different securing device.
Figure 20:
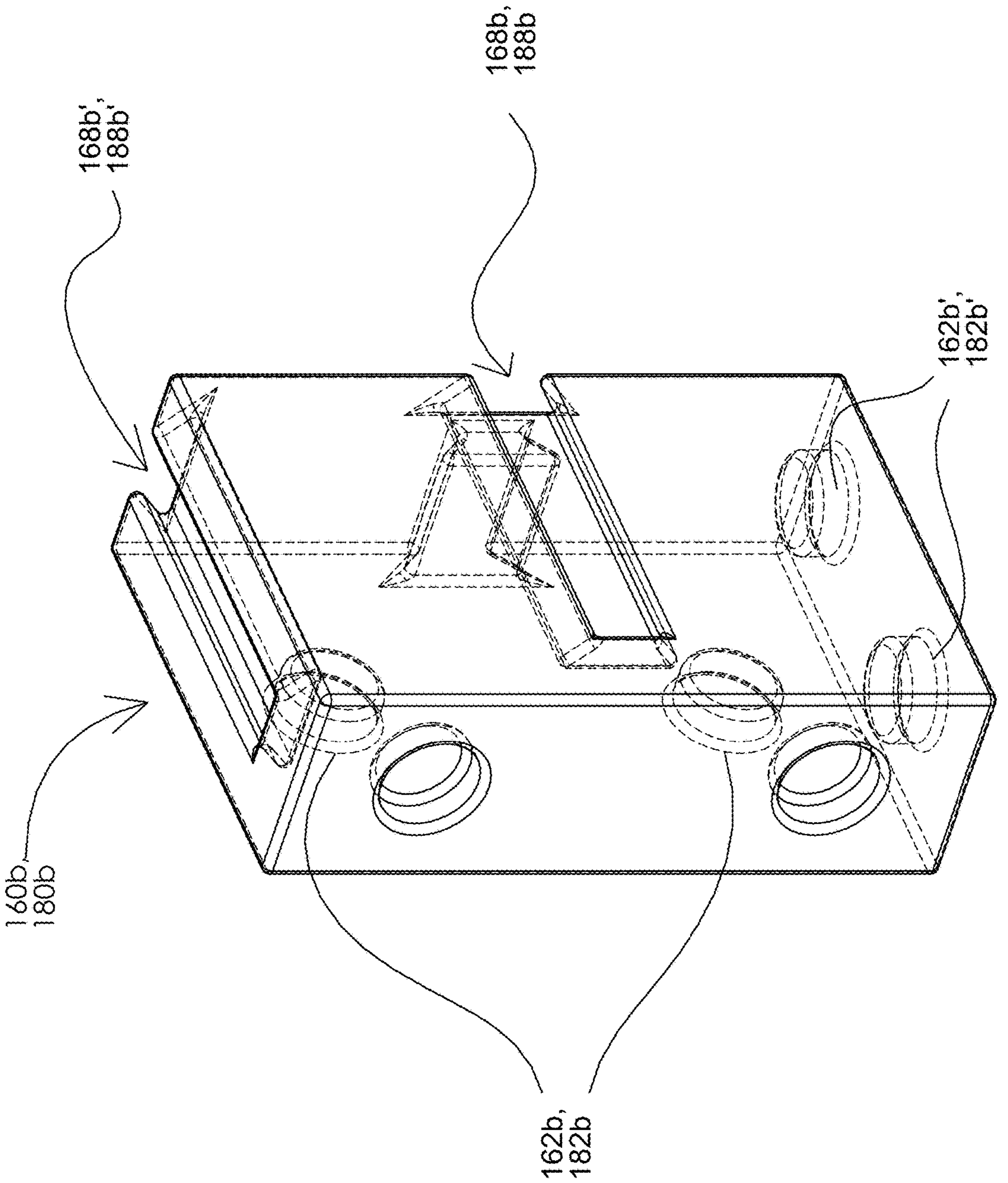
FIG. 20 is a perspective view of a further non-limiting example of a securing device.

FIG. 20 shows each of the first securing device 160*b* and second securing device 180*b* being a suction-type securing device (also as shown in FIGS. 8-10). The suction cups 162*b*,162*b*',182*b*,182*b*' are not shown but would be located at the applicable locations.

In a non-limiting, third embodiment (as shown in FIGS. 21-24) of the present invention, the splatter cover apparatus 300 is comprised of a two-piece, splatter cover 310 (which is nicknamed the "ying yang cover"), a first securing device 160*a*,360, and a second securing device 180*a*,380.

The two-piece, splatter cover 310 is comprised of a first or door cover section 320 and a second or back wall cover section 340, and is dimensioned and configured as a one-piece unit, when the first cover section 320 and second cover section 340 come together or toward one another for use, to sufficiently and effectively cover foods and drinks during use (heating or defrosting) such that food and drink splatters are minimized or prevented inside a microwave oven OV. In this non-limiting, third embodiment, the first cover section 320 and second cover section 340 are substantially or exactly the same as one another.

The first or door cover section 320 preferably has both a first cover section height 320*h* and a first cover section diameter 320*d*. As a non-limiting example, the first cover section 320 preferably includes a top 322 having a perimeter 324, an engagement surface or area 326, and a plurality of vent holes or apertures 327, and also includes a sidewall 328 extending downward from the perimeter 324 of the top 322. The top 322 has a boot configuration.

The first cover section 320 is capable of being detachably attached, secured or mounted in proximity or the vicinity of a first side or wall, such as the door DR (or a side or wall adjacent to the door DR), of the interior INT of the microwave oven OV by the first securing device 160*a* at a securing height with respect to a bottom side BS of the interior INT of the microwave oven OV.

The second or back wall cover section 340 preferably has both a second cover section height 340*h* and a second cover section diameter 340*d*. As a non-limiting example, the second cover section 340 includes a top 342 having a perimeter 344, an engagement surface or area 346, and a plurality of vent holes or apertures 347, and also includes a sidewall 348 extending downward from the perimeter 344 of the top 342. The top 342 has a boot configuration such that the top 322 and top 342 form an oblong round rectangle configuration when they come together or toward one another to operationally form the two-piece, splatter cover 310.

The second cover section 340 is capable of being detachably attached, secured or mounted in proximity or the vicinity of a second side or wall, such as the back wall BW (or a side or wall adjacent to the back wall BW and also opposite to the side or wall that is adjacent to the door DR), of the interior INT of the microwave oven OV by the second securing device 180*a* at a securing height with respect to the bottom side BS of the interior INT of the microwave oven OV.

Figure 21:
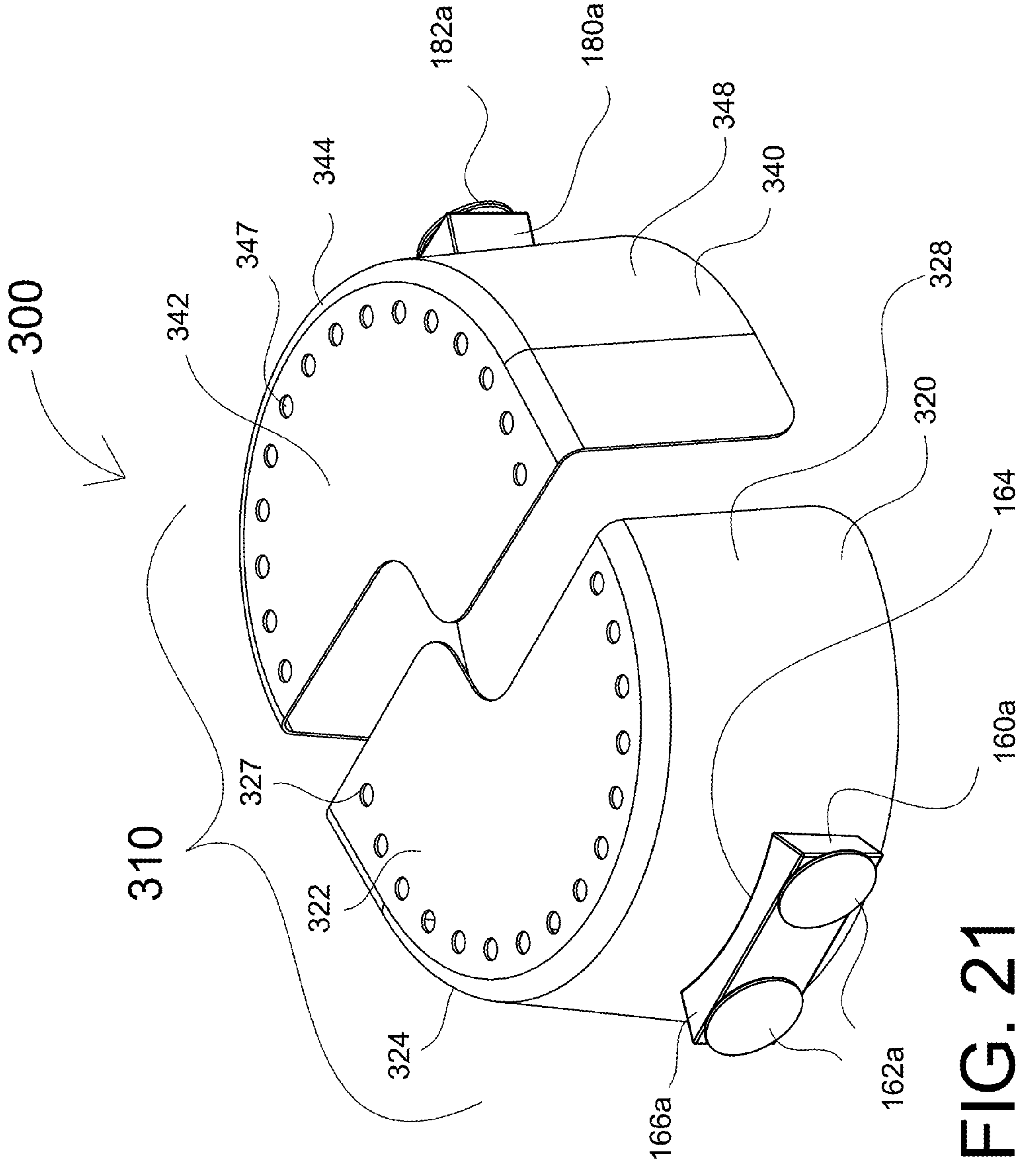
FIG. 21 is a perspective view of a third embodiment of a splatter cover apparatus according to the present invention, wherein the apparatus includes a two-piece splatter cover and securing devices.

As a non-limiting example of securing devices and as shown in FIG. 21, the first securing device and second securing device of this third embodiment are previously described and previously shown (FIGS. 1-7) first securing device 160*a* and second securing device 180*a*, respectively.

Figure 22:
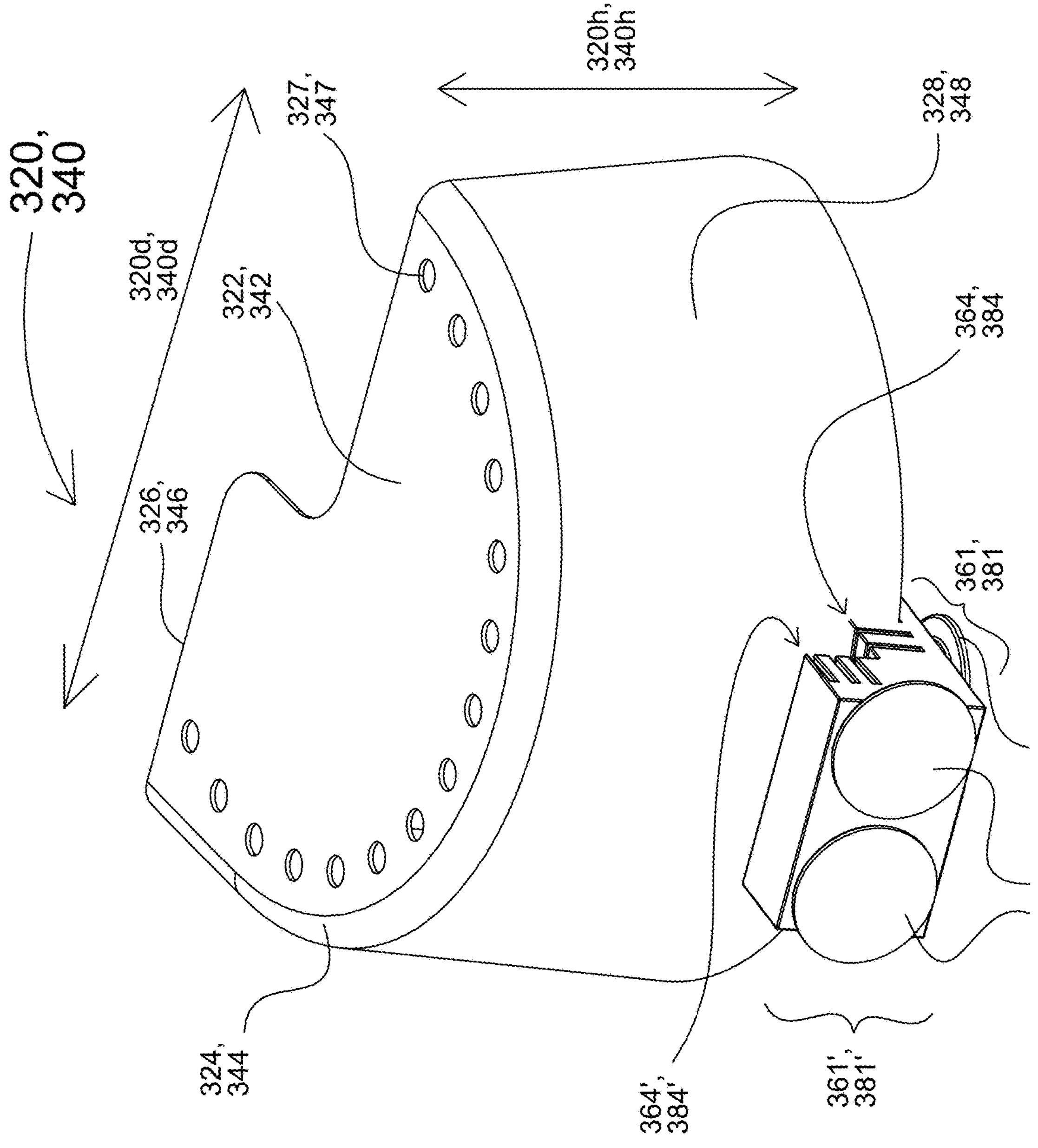
FIG. 22 is a perspective, rear view of one cover section of the two-piece splatter cover of FIG. 21, with a different securing device (in a first securing orientation)
Figure 23:
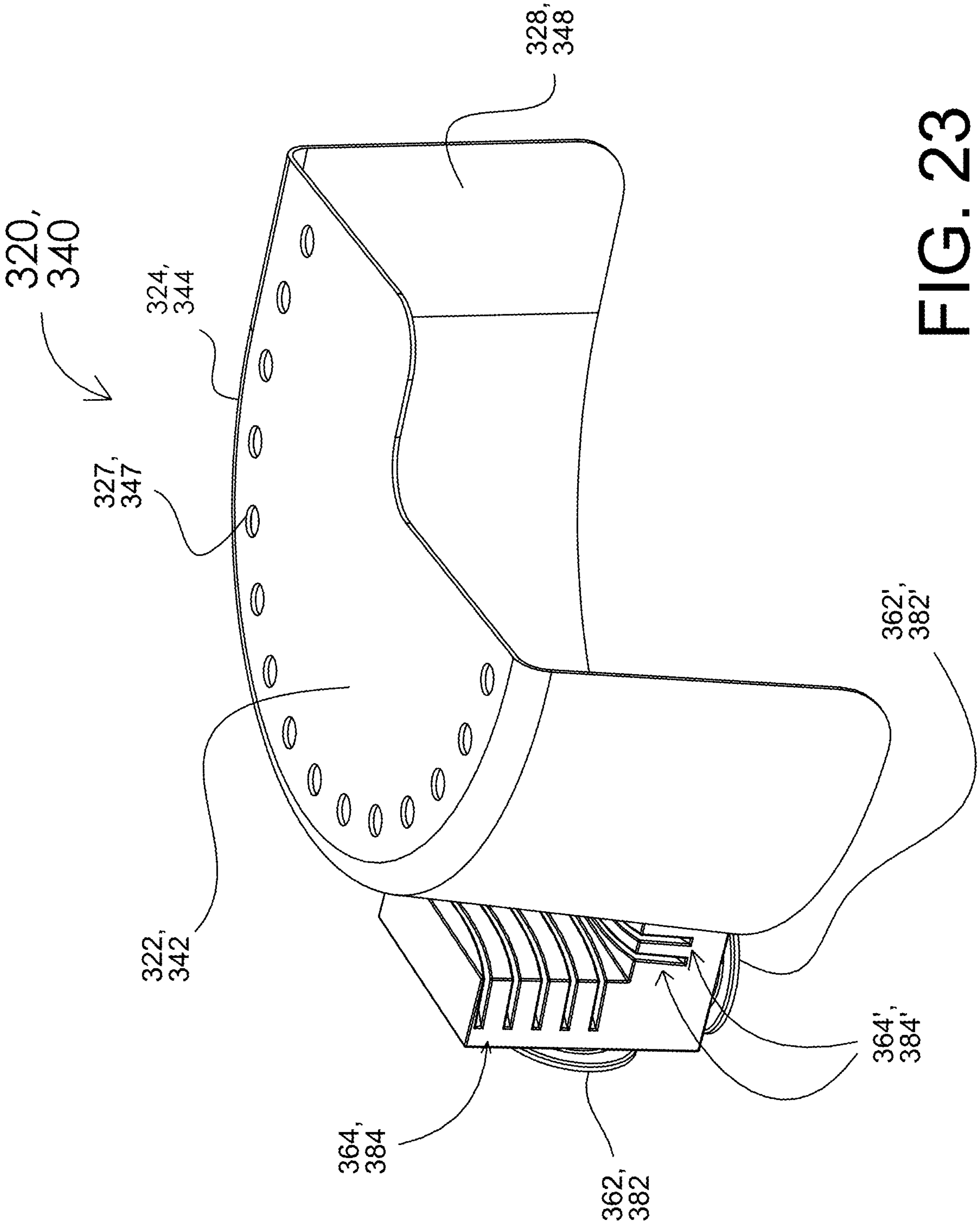
FIG. 23 is a perspective, front view of the one cover section of FIG. 21, with the different securing device of FIG. 22 (in a second securing orientation)

As another non-limiting example of securing devices and as shown in FIGS. 22-24, the first securing device and second securing device of this third embodiment are previously described and previously shown (FIG. 19) first securing device 360 and second securing device 380, respectively.

In a non-limiting, fourth embodiment (as shown in FIGS. 25-33) of the present invention, the splatter cover apparatus 400 is comprised of a two-piece, splatter cover 410 (which is nicknamed the "smaller plus larger cover"), a first securing device 160*a*, and a second securing device 180*a*.

The two-piece, splatter cover 410 is comprised of a first, door or smaller cover section 420 and a second, back wall or larger cover section 440, and is dimensioned and configured as a one-piece, overlapping unit, when the first cover section 420 and second cover section 440 come together for use, to sufficiently and effectively cover foods and drinks during use (heating or defrosting) such that food and drink splatters are minimized or prevented inside a microwave oven OV. In this non-limiting, fourth embodiment, the first cover section 420 fits under and substantially inside the second cover section 440.

The first or smaller cover section 420 preferably has both a first cover section height 420*h*, a first cover section diameter 420*d*, and a first cover section length 4201. As a non-limiting example, the first cover section 420 preferably includes a top 422 having a perimeter 424, an end surface or area 426, and a plurality of vent holes or apertures 427, and also includes a sidewall 428 extending downward from the perimeter 424 of the top 422. The top 422 has a half-circle or semi-circle configuration.

The first cover section 420 is capable of being detachably attached, secured or mounted in proximity or the vicinity of a first side or wall, such as the door DR (or a side or wall adjacent to the door DR), of the interior INT of the microwave oven OV by the first securing device 160*a* at a securing height with respect to a bottom side BS of the interior INT of the microwave oven OV.

The second, back wall or larger cover section 440 preferably has both a second cover section height 440*h*, a second cover section diameter 440*d*, and a second cover section length 4401. The second cover section height 440*h* is sufficiently greater than the first cover section height 420*h*, the second cover section diameter 440*d* is sufficiently greater than the first cover section diameter 420*d*, and the second cover section length 4401 is sufficiently greater than the first cover section length 4201 such that the first cover section 420 fits under and substantially inside the second cover section 440 during use.

As a non-limiting example, the second cover section 440 includes a top 442 having a perimeter 444, an end surface or area 446, and a plurality of vent holes or apertures 447, and also includes a sidewall 448 extending downward from the perimeter 444 of the top 442. The top 442 has a semi-oblong rectangular circle configuration such that the first cover section 420 fits under and substantially inside the second cover section 440 when they come toward one another to operationally form the two-piece, splatter cover 410.

The second or larger cover section 440 is capable of being detachably attached, secured or mounted in proximity or the vicinity of a second side or wall, such as the back wall BW (or a side or wall adjacent to the back wall BW and also opposite to the side or wall that is adjacent to the door DR), of the interior INT of the microwave oven OV by the second securing device 180*a* at a securing height with respect to the bottom side BS of the interior INT of the microwave oven OV.

As a non-limiting example of securing devices and as shown in FIGS. 25-32, the first securing device and second securing device of this third embodiment are previously described and previously shown (FIGS. 1-7) first securing device 160*a* and second securing device 180*a*, respectively.

In a non-limiting, fifth embodiment (as shown in FIGS. 34-39) of the present invention, the splatter cover apparatus 500 is comprised of a four-piece, splatter cover 510, a first securing device 160*a*, and a second securing device 180*a*.

The four-piece, splatter cover 510 is comprised of a first or door cover section 520, a second or back wall cover section 540, and a pair of extensions 560,580, and is dimensioned and configured as a one-piece unit, when the first cover section 520 and second cover section 540 come together or toward one another for use (especially when the pair of extensions 560,580 are engaged with the first cover section 520 and second cover section 540), to sufficiently and effectively cover foods and drinks during use (heating or defrosting) such that food and drink splatters are minimized or prevented inside a microwave oven OV. In this non-limiting, fifth embodiment, the first cover section 520 and second cover section 540 are substantially or exactly the same as one another (and preferably, substantially or exactly the same as the first cover section 120 and second cover section 140 of the first embodiment), and the extensions 560,580 are substantially or exactly the same as one another.

The first or door cover section 520 preferably has both a first cover section height 520*h* and a first cover section diameter 520*d*. As a non-limiting example, the first cover section 520 preferably includes a top 522 having a perimeter 524, an engagement surface or area 526, and a plurality of vent holes or apertures 527, and also includes a sidewall 528 extending downward from the perimeter 524 of the top 522 and a flange 529 extending outward from the bottom of the sidewall 528. The top 522 has a semi-circle or half-circle configuration.

The first cover section 520 is capable of being detachably attached, secured or mounted in proximity or the vicinity of a first side or wall, such as the door DR (or a side or wall adjacent to the door DR), of the interior INT of the microwave oven OV by the first securing device 160*a* at a securing height with respect to a bottom side BS of the interior INT of the microwave oven OV.

The second or back wall cover section 540 preferably has both a second cover section height 540*h* and a second cover section diameter 540*d*. As a non-limiting example, the second cover section 540 includes a top 542 having a perimeter 544, an engagement surface or area 546, and a plurality of vent holes or apertures 547, and also includes a sidewall 548 extending downward from the perimeter 544 of the top 542 and a flange 549 extending outward from the bottom of the sidewall 548. The top 542 has a semi-circle or half-circle configuration such that the top 522 and top 542 form a circle configuration when they come together or toward one another to operationally form the three-piece, splatter cover 510.

The second cover section 540 is capable of being detachably attached, secured or mounted in proximity or the vicinity of a second side or wall, such as the back wall BW (or a side or wall adjacent to the back wall BW and also opposite to the side or wall that is adjacent to the door DR), of the interior INT of the microwave oven OV by the second securing device 180*a* at a securing height with respect to the bottom side BS of the interior INT of the microwave oven OV.

Figure 34:
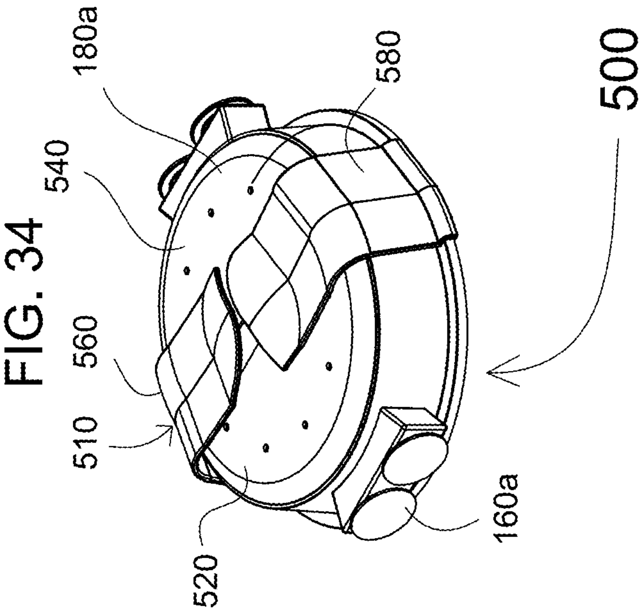
FIG. 34 is a perspective view of a fifth embodiment of a splatter cover apparatus according to the present invention, wherein the apparatus includes a four-piece splatter cover and securing devices.
Figure 35:
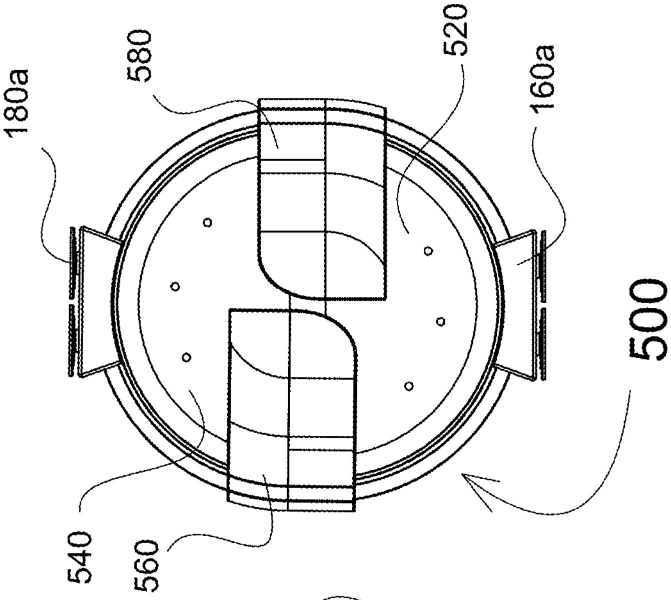
FIG. 35 is a top view of the splatter cover apparatus of FIG. 34.
Figure 36:
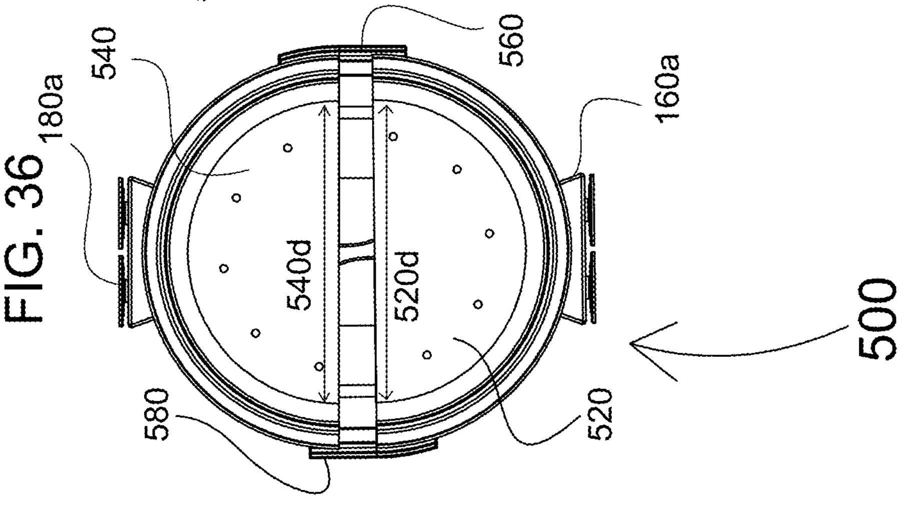
FIG. 36 is a bottom view of the splatter cover apparatus of FIG. 34.
Figure 37:
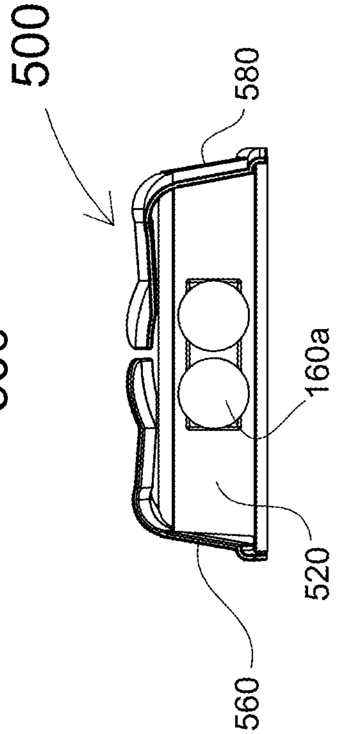
FIG. 37 is an end view of the splatter cover apparatus of FIG. 34.
Figure 38:
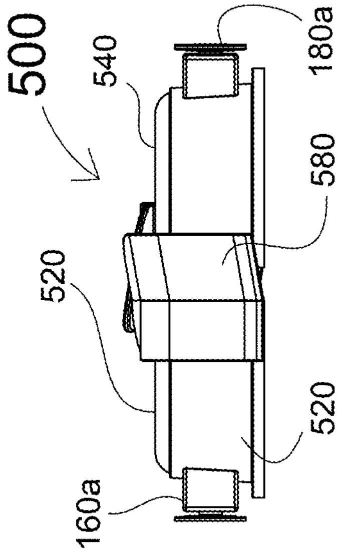
FIG. 38 is a side view of the splatter cover apparatus of FIG. 34.
Figure 39:
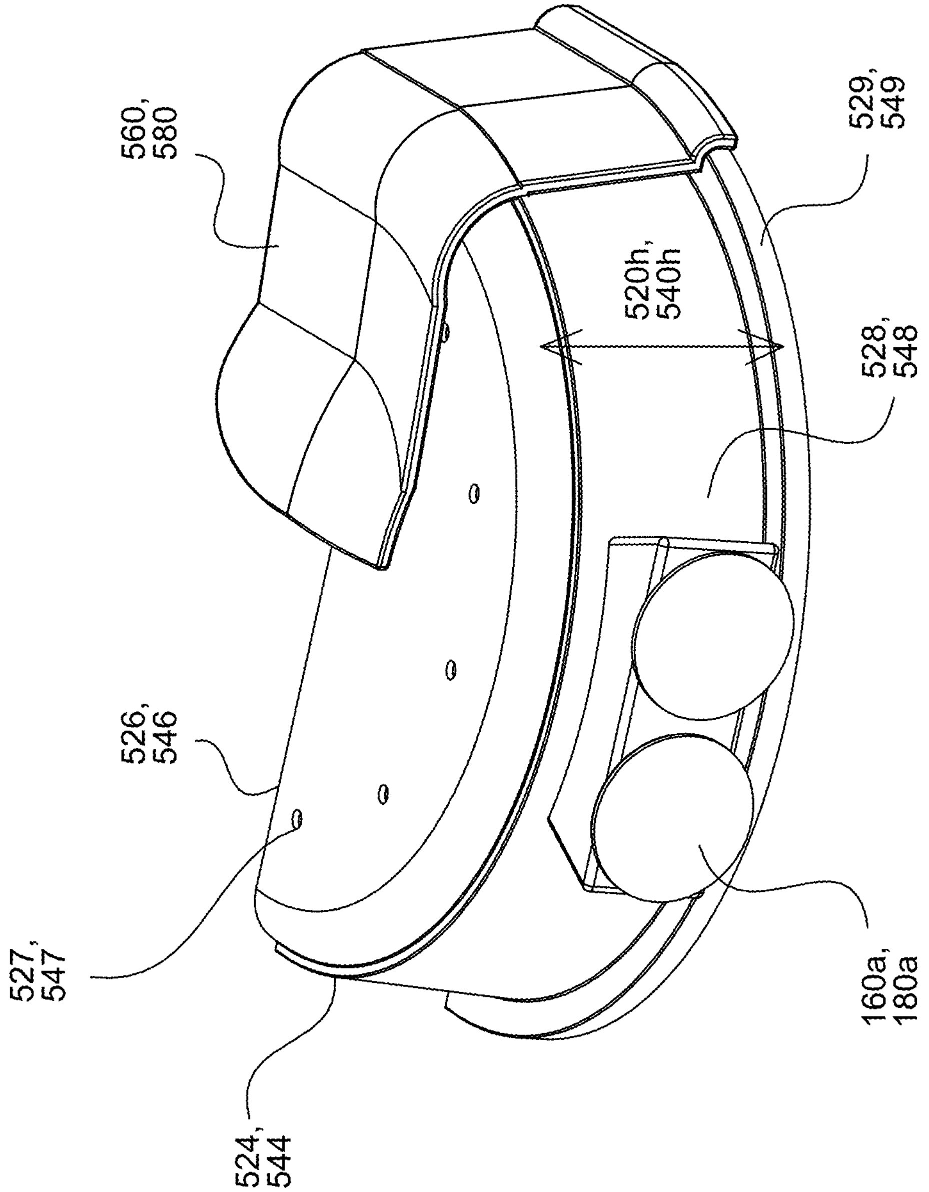
FIG. 39 is a perspective, end, top view of one cover section and one extension of FIG. 34.
Figure 42:
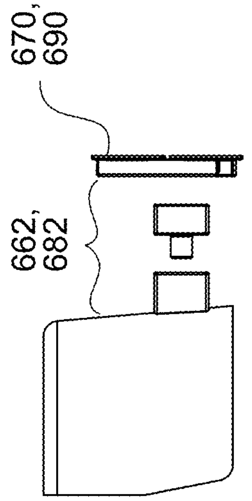
FIG. 42 is a side view of the one cover section and securing device of FIG. 40.
Figure 41:
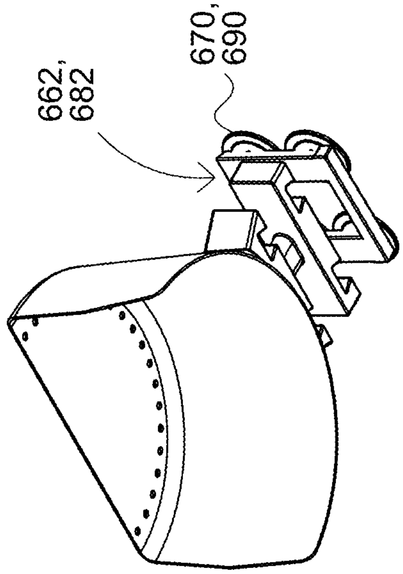
FIG. 41 is a perspective, front, bottom view of the one cover section and securing device of FIG. 40.
Figure 40:
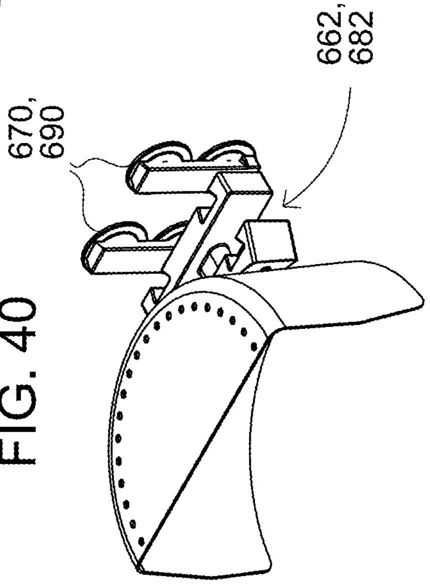
FIG. 40 is a perspective, front, top view of one cover section with another non-limiting example of a securing device.
Figure 44:
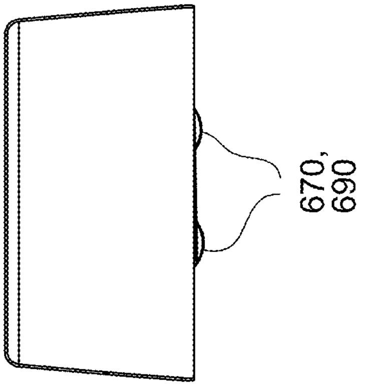
FIG. 44 is a front view of the one cover section and securing device of FIG. 40.
Figure 43:
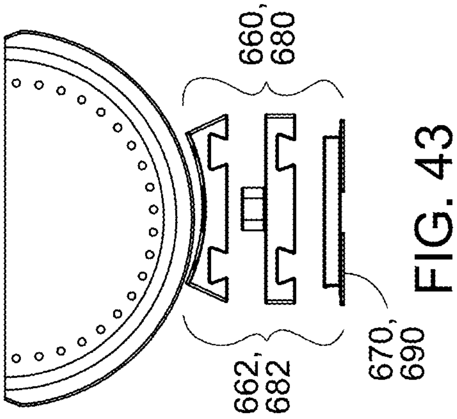
FIG. 43 is a bottom view of the one cover section and securing device of FIG. 40.
Figure 45:
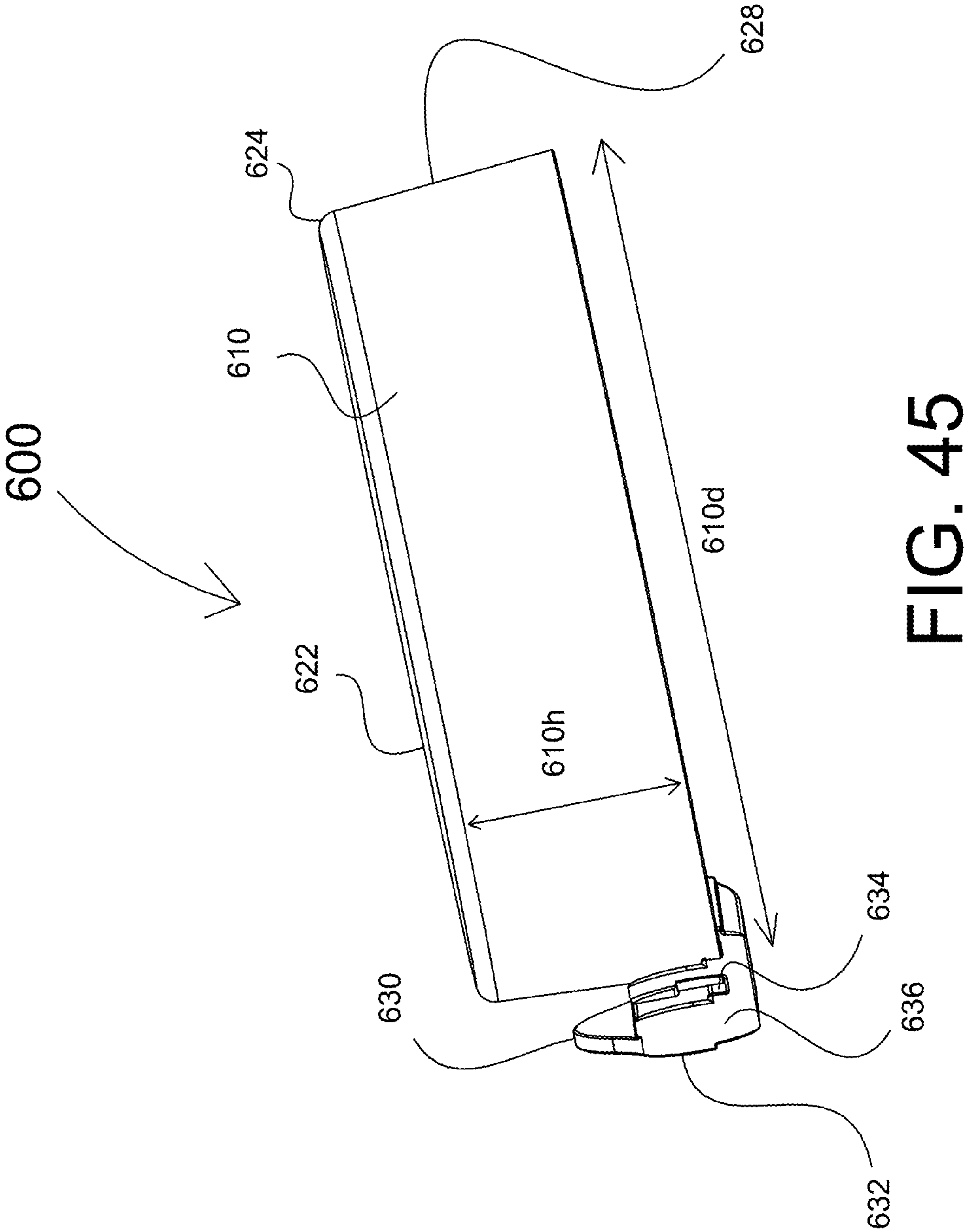
FIG. 45 is a perspective view of a sixth embodiment of a splatter cover apparatus according to the present invention, wherein the apparatus includes a one-piece splatter cover and a securing device.
Figure 46:
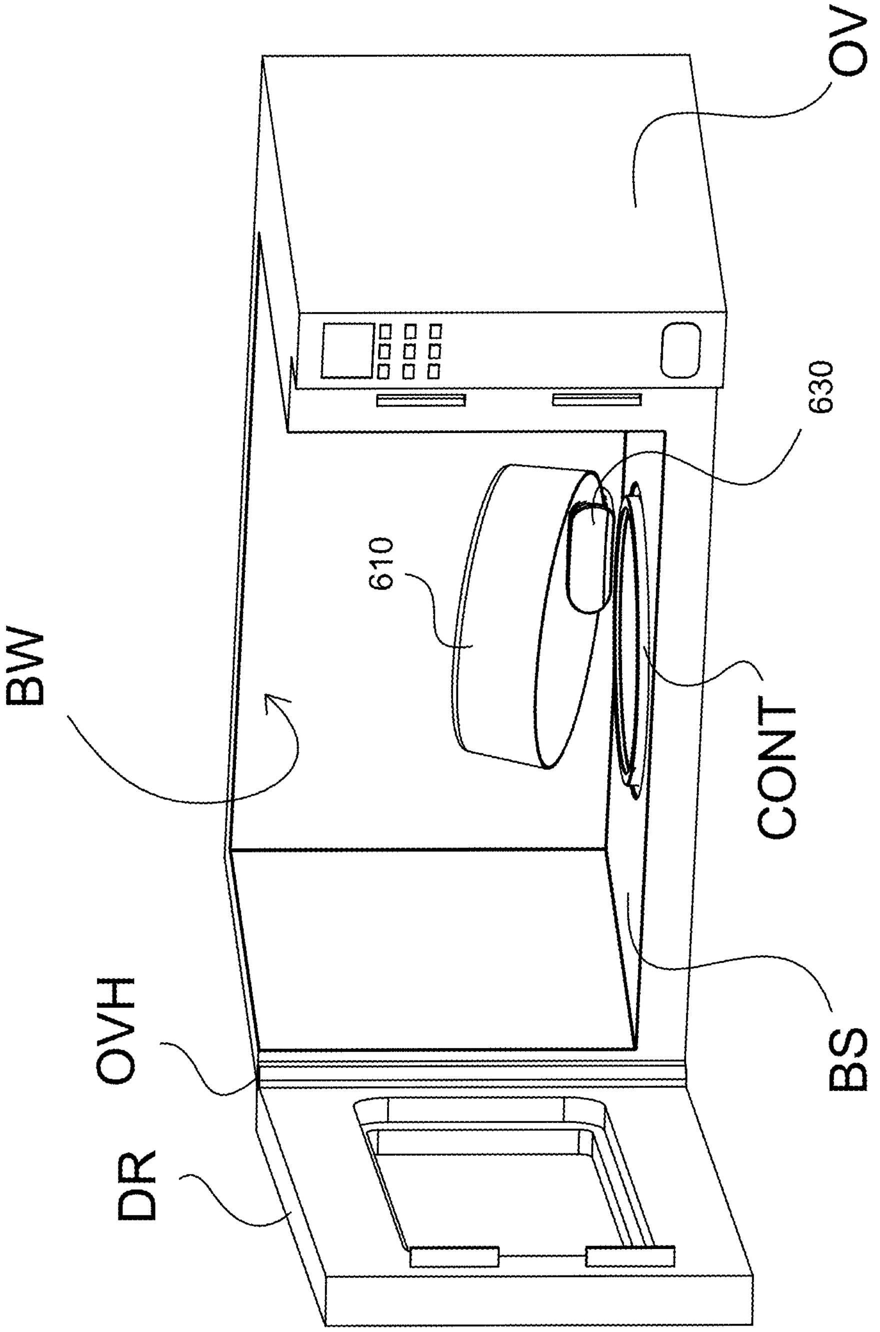
FIG. 46 is an environmental, perspective view of the splatter cover apparatus of FIG. 45, wherein the splatter cover is in a raised position relative to a food container, wherein the door of a microwave oven is in an open position, and wherein the top of the microwave oven has been removed for better viewing.
Figure 47:
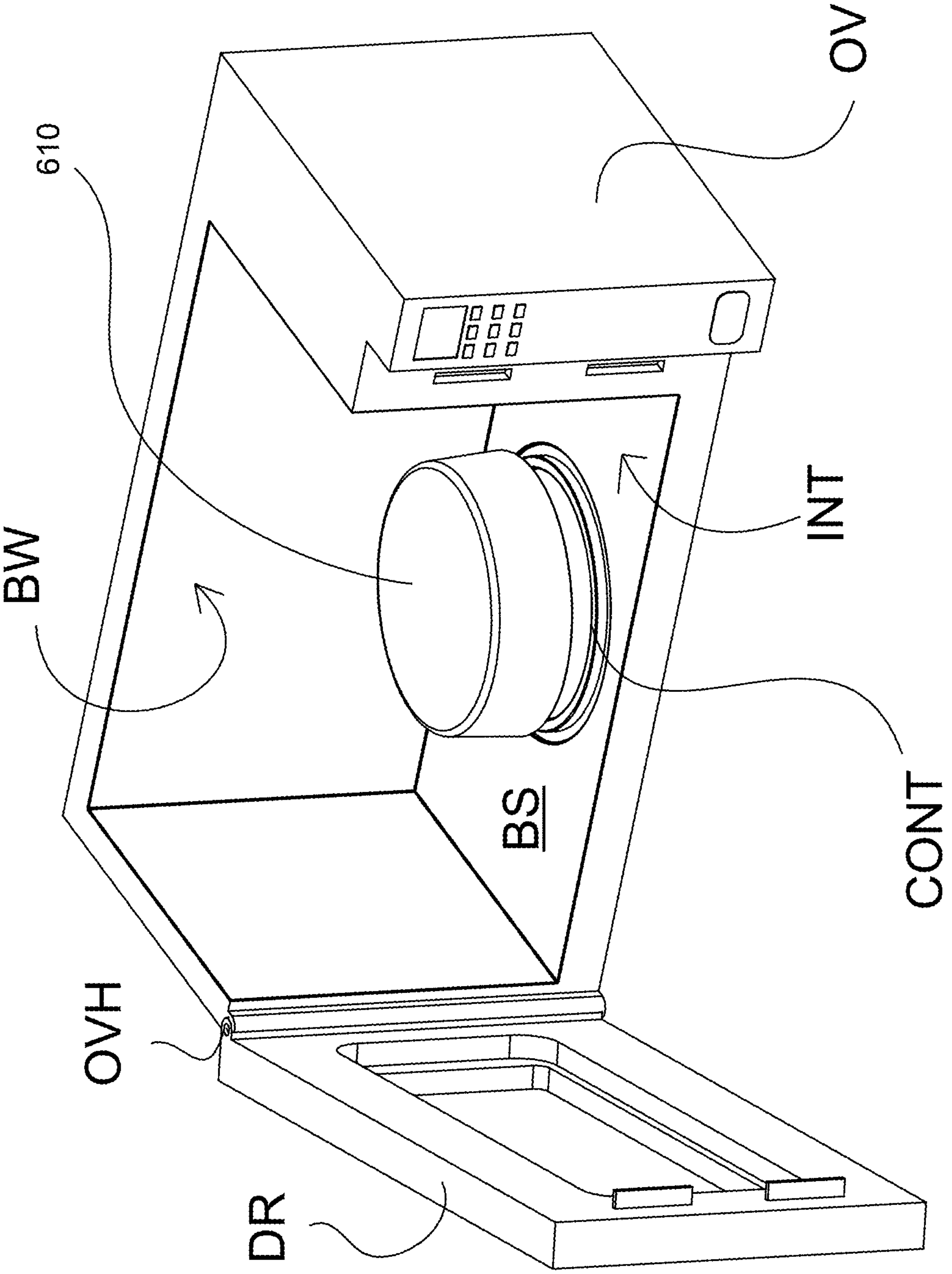
FIG. 47 is an environmental, perspective view of the splatter cover apparatus of FIG. 45, wherein the splatter cover is in a lowered position relative to a food container, wherein the door of a microwave oven is in an open position, and wherein the top of the microwave oven has been removed for better viewing.

As shown in FIGS. 34, 35 and 37, each of the extensions 560,580 is preferably positioned opposite one another and near the corresponding engagement surface or area 526,546 such that the extensions 560,580 can be used for substantially or entirely covering an operational vent gap or distance between the first cover section 520 and second cover section 540 when the first cover section 520 and second cover section 540 are positioned adjacent to one another for use or operation.

As a non-limiting example of securing devices and as shown in FIGS. 1-7 and 34-39, each of the first securing device 160*a* and second securing device 180*a* is a suction-type securing device. Preferably, the first securing device 160*a* and second securing device 180*a* are substantially or exactly the same as one another.

As a further non-limiting example of securing devices and as shown in FIGS. 40-44, each of the first securing device 660 and second securing device 680 is a device with an adjustable bracket system 662,682 and at least one (preferably more than one) suction 670,690. Preferably, the first securing device 660 and second securing device 680 are substantially or exactly the same as one another.

In a non-limiting, sixth embodiment (as shown in FIGS. 45-47 and 51-52) of the present invention, the splatter cover apparatus 600 is comprised of a one-piece, splatter cover 610 and a securing device 630.

The one-piece, splatter cover 610 is dimensioned and configured to sufficiently and effectively cover foods and drinks during use (heating or defrosting) such that food and drink splatters are minimized or prevented inside a microwave oven OV. The splatter cover 610 has both a cover height 610*h* and a cover diameter 610*d*. The splatter cover 610 includes a top 622 having a perimeter 624, and also includes a sidewall 628 extending downward from the perimeter 624 of the top 622. The top 622 has a round or circle configuration.

The splatter cover 610 is capable of being detachably attached, secured or mounted in proximity or the vicinity of a side or wall, such as the back wall BW (or a side or wall adjacent to the back wall BW), of the interior INT of the microwave oven OV by the securing device 630 at a securing height with respect to the bottom side BS of the interior INT of the microwave oven OV.

Figure 51:
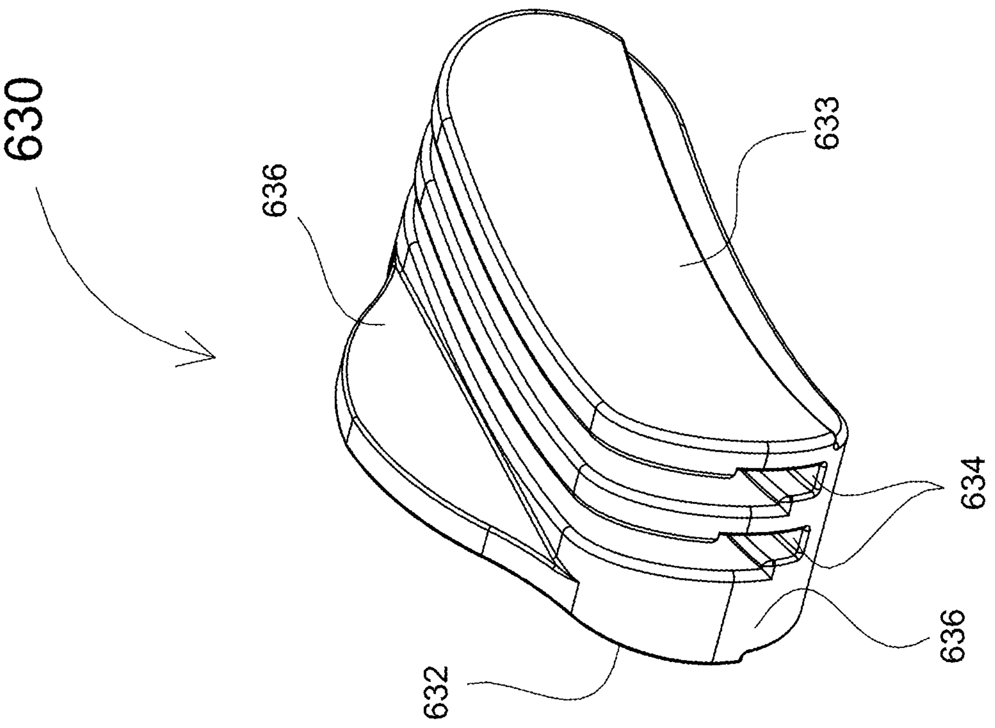
FIG. 51 is a perspective view of a non-limiting example of a securing device.

As best shown in FIGS. 51-52, the securing device 630 comprises a first or back wall securing portion 632, a front wall securing portion 633, a cover securing portion 634, and a body 636 disposed between or among the back wall securing portion 632 and cover securing portion 634. The back wall securing portion 632 may be attached, secured or mounted to a corresponding portion of the back wall BW or side wall by any method, device or feature known to one of ordinary skill in the art, such as, but not limited to, adhesive or suction(s). Preferably, the suction(s) permit the securing device 630 to be adjustable vertically (upward or downward relative to a first securing position) and also laterally (rightward or leftward relative to the first securing position) along the back wall BW (or a side or wall adjacent to the back wall BW). The cover securing portion 634 is preferably at least one (preferably more than one) receiving slot 634 dimensioned and configured for receiving a corresponding portion of the splatter cover 610. Preferably, each of the receiving slots 634 is dimensioned and configured to permit the retained corresponding portion of the splatter cover 610 to be moved rearward at an angle a sufficient amount so that the splatter cover 610 can be raised a sufficient amount of height for accommodating a food container CONT containing food and/or drink and then also to permit the retained corresponding portion of the splatter cover 610 to be moved forward at an angle a sufficient amount so that the splatter cover 610 can be lowered a sufficient amount of height for covering the food container CONT containing food and/or drink prior to use.

Figure 48:
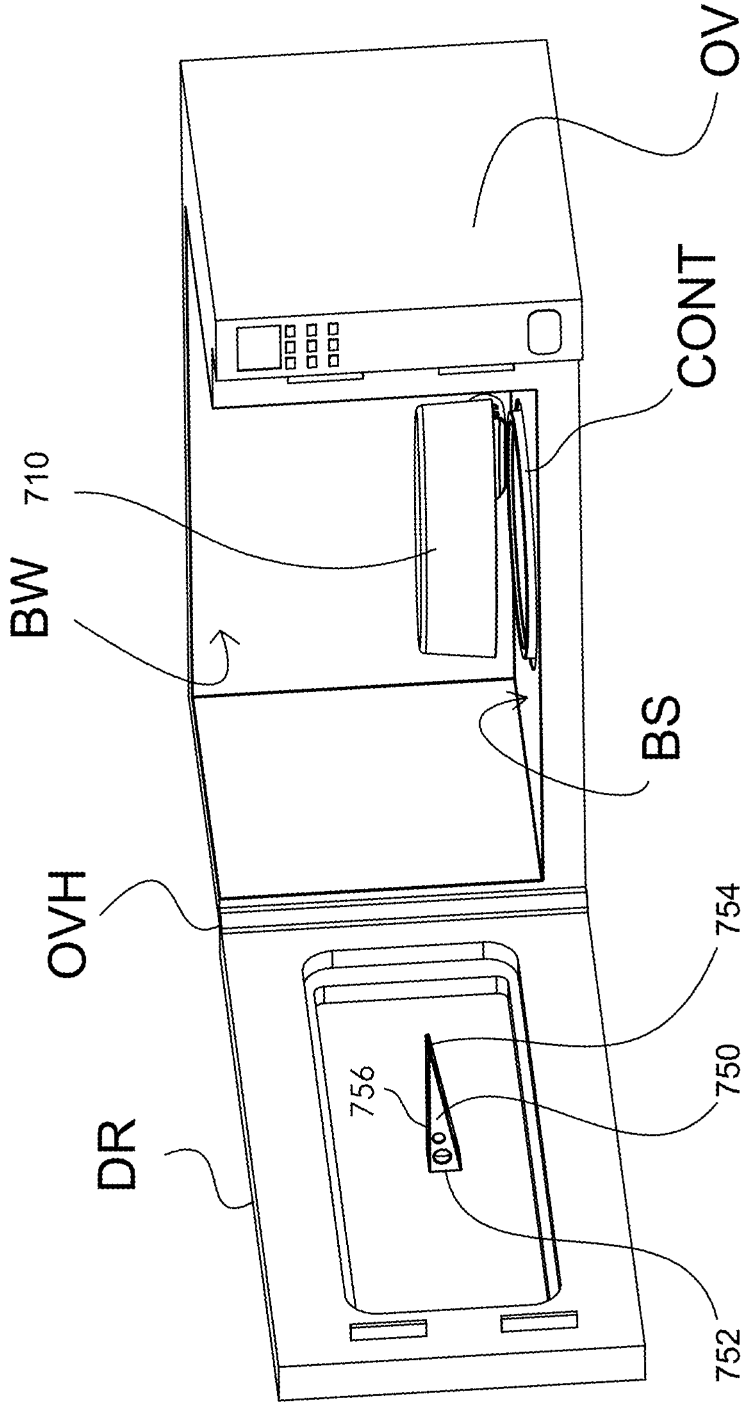
FIG. 48 is an environmental, perspective view of a seventh embodiment of a splatter cover apparatus according to the present invention, wherein the apparatus includes a one-piece splatter cover, a securing device, and a stopper, wherein the door of a microwave oven is in an open position, and wherein the top of the microwave oven has been removed for better viewing.
Figure 49:
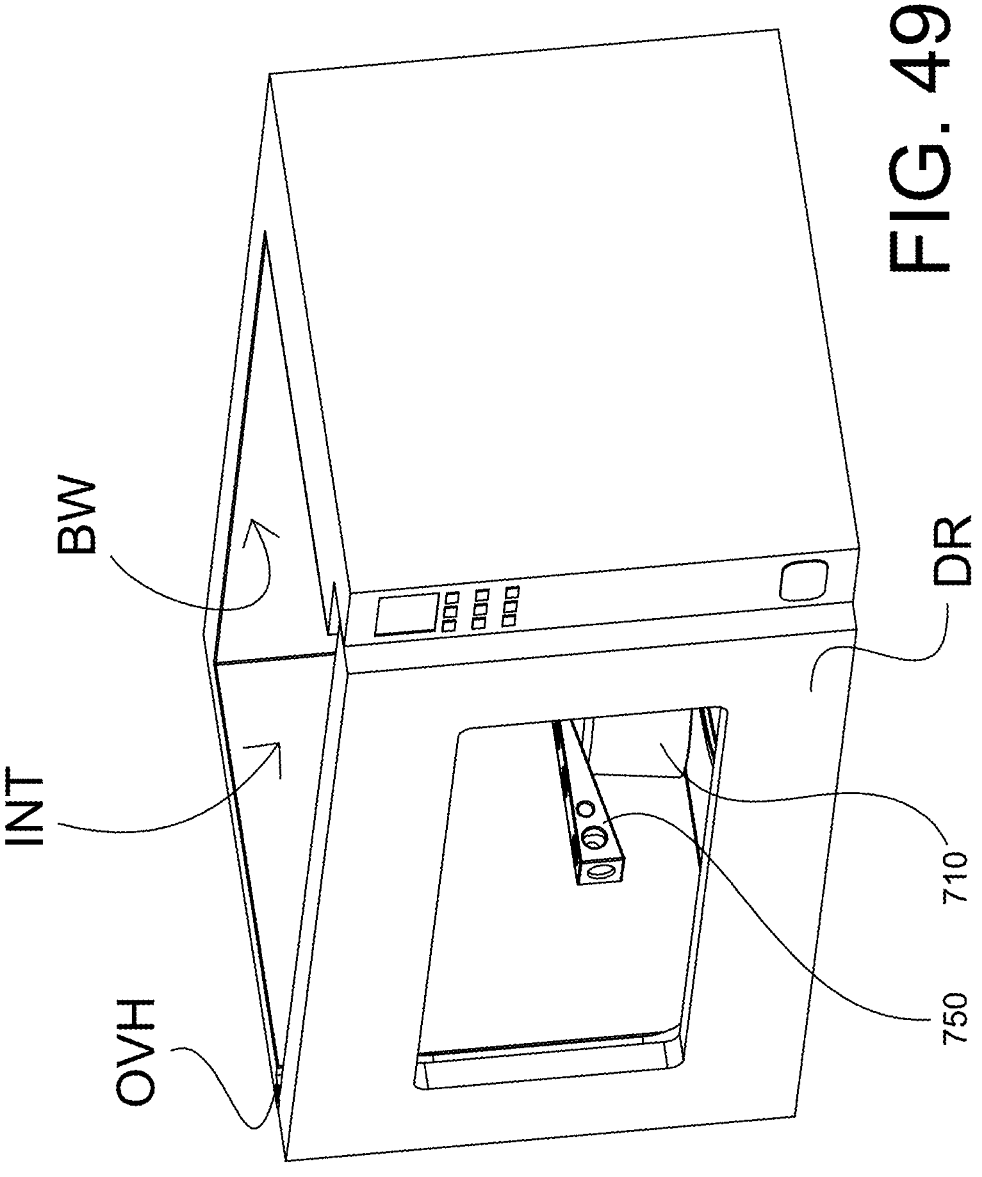
FIG. 49 is an environmental, perspective view of the splatter cover apparatus of FIG. 48, wherein the splatter cover is engaged underneath the stopper, wherein the door of a microwave oven is in a closed or operating position. and wherein the top of the microwave oven has been removed for better viewing.
Figure 50:
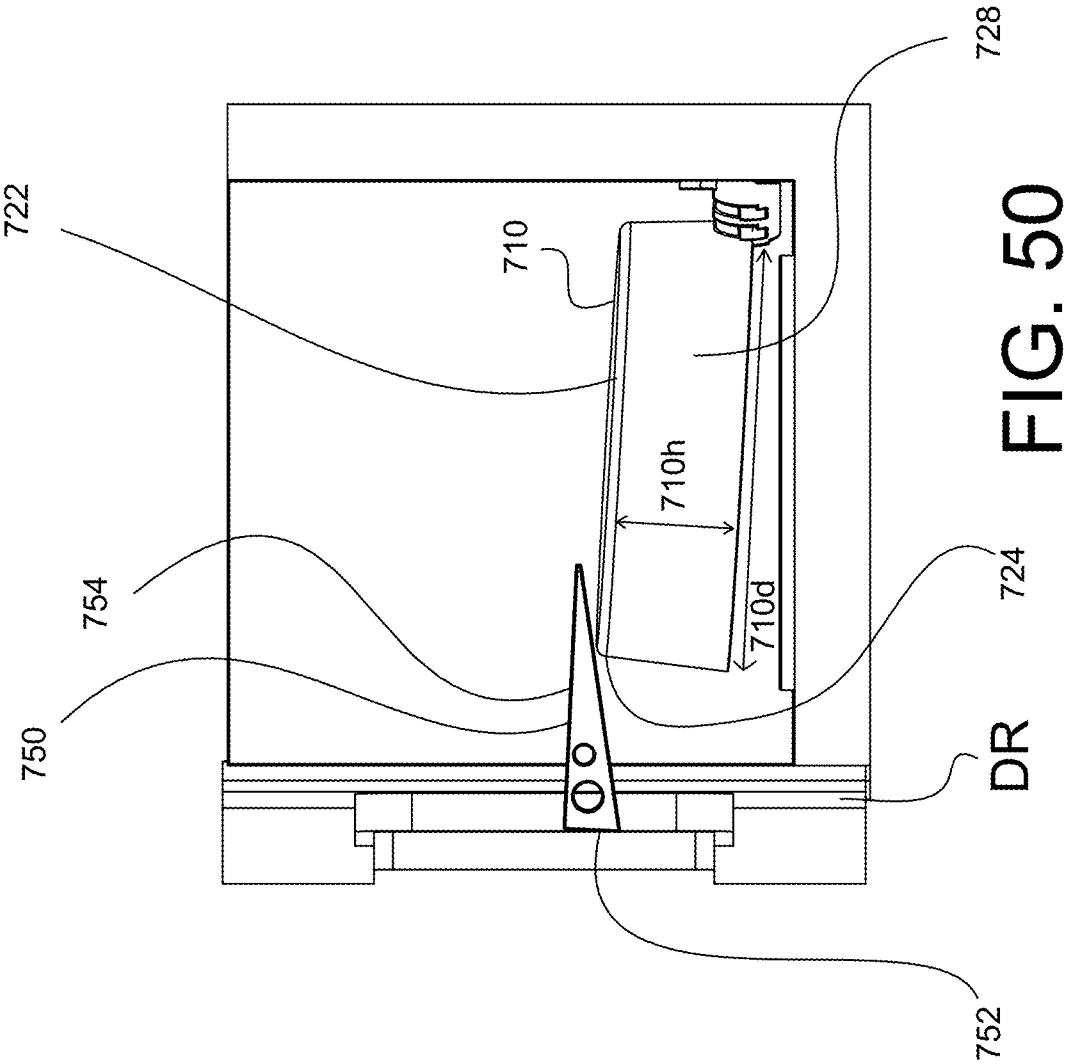
FIG. 50 is an environmental, side cut-away view of the splatter cover apparatus of FIG. 48, wherein the splatter cover is engaged underneath the stopper, and wherein the door of a microwave oven is in a closed or operating position.

In a non-limiting, seventh embodiment (as shown in FIGS. 48-50) of the present invention, the splatter cover apparatus 700 is comprised of a one-piece, splatter cover 710, a securing device 730, and a stopper 750.

The one-piece, splatter cover 710 is dimensioned and configured to sufficiently and effectively cover foods and drinks during use (heating or defrosting) such that food and drink splatters are minimized or prevented inside a microwave oven OV. The splatter cover 710 has both a cover height 710*h* and a cover diameter 710*d*. The splatter cover 710 includes a top 722 having a perimeter 724, and also includes a sidewall 728 extending downward from the perimeter 724 of the top 722. The top 722 has a round or circle configuration.

The splatter cover 710 is capable of being detachably attached, secured or mounted in proximity or the vicinity of a side or wall, such as the back wall BW (or a side or wall adjacent to the back wall BW), of the interior INT of the microwave oven OV by the securing device 730 at a securing height with respect to the bottom side BS of the interior INT of the microwave oven OV.

The securing device 730 comprises a first or back wall securing portion 732, a second or cover securing portion 734, and a body 736 disposed between or among the securing portions 732 and 734. The first securing portion 732 may be attached, secured or mounted to a corresponding portion of the back wall BW or side wall by any method, device or feature known to one of ordinary skill in the art, such as, but not limited to, adhesive or suction(s). Preferably, the suction(s) permit the securing device 730 to be adjustable vertically (upward or downward relative to a first securing position) and also laterally (rightward or leftward relative to the first securing position) along the back wall BW (or a side or wall adjacent to the back wall BW). The second securing portion 734 is preferably at least one (preferably more than one) receiving slot 734 dimensioned and configured for receiving a corresponding portion of the splatter cover 710. Preferably, each of the receiving slots 734 is dimensioned and configured to permit the retained corresponding portion of the splatter cover 710 to be moved rearward at an angle a sufficient amount so that the splatter cover 710 can be raised a sufficient amount of height for accommodating a food container CONT containing food and/or drink and then also to permit the retained corresponding portion of the splatter cover 710 to be moved forward at an angle a sufficient amount so that the splatter cover 710 can be lowered a sufficient amount of height for covering the food container CONT containing food and/or drink prior to use.

The stopper 750 comprises a first or door securing portion 752, a second or cover engagement portion 754, and a body 756 disposed between or among the door securing portion 752 and the cover engagement portion 754. The door securing portion 752 may be attached, secured or mounted to a corresponding portion of the door DR by any method, device or feature known to one of ordinary skill in the art, such as, but not limited to, adhesive or suction(s). Preferably, the suction(s) permit the stopper 750 to be adjustable vertically (upward or downward relative to a first securing position) and also laterally (rightward or leftward relative to the first securing position) along the door DR (or a side or wall adjacent to the door DR). The cover engagement portion 754 is dimensioned and configured for engaging with a corresponding portion of the splatter cover 710 such that the splatter cover 710 is positioned generally below the stopper 750 during use or operation.

It is preferred that any of the securing devices of the present invention and that are disclosed in the application may be used with any of the cover sections (first cover section, second cover section, and whole cover section) of the present invention and disclosed in the application. As a non-limiting example or embodiment, any of the cover sections can have a mounting "block" or securing device, such as, but not limited to, 160*a*,180*a*, permanently attached to the cover section. The mounting "blocks" or securing device of the cover sections may be pressed against the microwave oven back wall BW and door DR allowing the "blocks" and attached cover sections to stay in place via suction cups, magnets, or other attachment means.

As another non-limiting example or embodiment, the mounting "blocks" or securing devices with channels or receiving slots (such as, but not limited to, 360,380 with 364,384,364',384') hold the cover sections or halves in place. The cover sections or halves can be easily removed from the channels or receiving slots 364,384,364',384'. Mounting "blocks" or securing devices 360,380 have multiple channels or receiving slots 364,384,364',384' to accommodate mounting in different size microwave ovens. The mounting "blocks" or securing devices 360,380 can include different mounting geometry to allow one block to accommodate large, medium and small microwave ovens. The mounting "blocks" or securing devices 360,380 may mount in more than one way to the inside of the microwave oven allowing for one block design to be used for different microwave ovens.

As a further non-limiting example or embodiment, the mounting means is preferably via suction cup or suctions cups. Other mounting systems using magnets, hook and loop fasteners, adhesives or other means may be used. The mounting system for the door-mounted cover section may be placed over the microwave door DR. The mounting cover on the back wall BW may be mounted via a mechanical mechanism such as telescoping legs that are held in place via internal springs that connect to the internal side walls or the microwave oven OV or roof and floor of the microwave wave OV.

As an additional non-limiting example or embodiment, the mounting "blocks" or securing devices may include channels that mate up to covers with complimentary structures on the cover sections. The mounting "blocks" or securing devices may also include shafts or tabs that allow the mounting system to telescope. The telescoping parts allow the mounting system dimensions to be changed to accommodate different microwave oven sizes.

As another additional non-limiting example or embodiment, the split microwave oven cover (such as, but not limited to, 110) may also be held in place via mounts that are installed as part of a microwave oven's structure when manufactured at a factory.

As a further non-limiting example or embodiment, the split covers (such as, but not limited to, 110) are designed to have enough height to provide clearance over mugs that are placed inside the microwave oven OV. This allows the covers to be used with both plates and mugs unlike most conventional microwave splatter covers.

Preferably, the brackets that go onto the wall (such as, but not limited to, BW) and door DR of the microwave oven OV may be attached or secured by any of the following devices or methods: suction cups, magnets, silicone rubber pads (or other type of elastomeric material) that adhere to smooth surfaces (and therefore act like suction cups), hook and loop fastener (held in place via adhesive backings), adhesive/glue, adhesive pads, and double-sided tapes or foam. The brackets that go onto the wall (such as, but not limited to, BW) and door DR of the microwave oven OV may also be attached or secured by any device or method known to one of ordinary skill in the art.

As non-limiting examples, the suction cups and magnets (or other attachment device) may be in quantities of one, two, three, four or more on each side/cover or bracket. The silicone rubber pad for instance may cover the whole of the bracket that attaches to the wall (such as, but not limited to, BW) and door DR.

It is to be understood that the present invention is not limited to the embodiments and aspects described above or as shown in the attached figures, but encompasses any and all embodiments and aspects within the spirit of the invention.

The invention claimed is:

1. A splatter cover apparatus for minimizing or preventing food and drink splatters inside a microwave oven, said apparatus comprising:

a splatter cover dimensioned and configured to sufficiently and effectively cover foods and drinks during use such that food and drink splatters are minimized or prevented inside the microwave oven, wherein said splatter cover is adapted for being attached, secured or mounted inside the microwave oven during non-use and also during use such that a user of the microwave oven is able to avoid touching or handling said splatter cover prior to use, wherein said splatter cover comprises a top, a sidewall, a cover section height, and a cover section diameter, wherein said top comprises a perimeter, and wherein said sidewall extends downward from said perimeter of said top; and at least one securing device secured to at least one side or wall selected from the group consisting of a right side or wall, a left side or wall, a back side or wall, and a front side or wall of an interior of the microwave oven, wherein said at least one securing device is capable of detachably securing said splatter cover in the interior of the microwave oven at a securing height with respect to a bottom side of the interior of the microwave oven during non-use and also during use, wherein each of said at least one securing device comprises a first securing portion and a second securing portion, wherein said first securing portion is capable of securing said at least one securing device to the at least one side or wall of the microwave oven, wherein said first securing portion permits said splatter cover to be adjustable vertically and laterally along the at least one side or wall of the microwave oven, and wherein said second securing portion is dimensioned and configured to receive and detachably retain a corresponding portion of said splatter cover.

2. The splatter cover apparatus according to claim 1, wherein said splatter cover is a two-piece splatter cover comprising a first cover section and a second cover section, wherein said first cover section comprises a top, a sidewall, a first cover section height, and a first cover section diameter, wherein said top of said first cover section comprises a perimeter and an engagement surface or area, wherein said sidewall of said first cover section extends downward from said perimeter of said top of said first cover section;

wherein said second cover section comprises a sidewall and a second cover section height, and wherein said first cover section and said second cover section, when acting as a one-piece unit when said first cover section and said second cover section come together or toward one another for use, are dimensioned and configured to sufficiently and effectively cover foods and drinks during use such that food and drink splatters are minimized or prevented inside the microwave oven, wherein said at least one securing device is a first securing device and a second securing device, wherein said first securing device is capable of detachably securing said first cover section in proximity or vicinity of a first side or wall of an interior of the microwave oven at a securing height with respect to a bottom side of the interior of the microwave oven, wherein said first securing device comprises a first securing portion and a second securing portion, wherein the first side or wall of the interior of the microwave oven is selected from the group consisting of a door and a side or wall adjacent to the door, wherein said first securing portion of said first securing device is capable of securing said first securing device to the first side or wall of the interior of the microwave oven, and wherein said second securing portion of said first securing device is capable of securing a corresponding portion of said first cover section, wherein said second securing device is capable of detachably securing said second cover section in proximity or vicinity of a second side or wall of the interior of the microwave oven at a securing height with respect to the bottom side of the interior of the microwave oven, wherein said second securing device comprises a first securing portion and a second securing portion, wherein the second side or wall of the interior of the microwave oven is selected from the group consisting of a back wall and a side or wall adjacent to the back wall and also opposite to the side or wall that is adjacent to the door, wherein said first securing portion of said second securing device is capable of securing said second securing device to the second side or wall of the interior of the microwave oven, wherein said second securing portion of said second securing device is capable of securing a corresponding portion of said second cover section, and wherein at least one of said first securing portion of said second securing device and said first securing portion of said second securing device permits a corresponding cover section of said first cover section and said first cover section to be adjustable vertically and laterally along the corresponding side or wall of the interior of the microwave oven.

3. The splatter cover apparatus according to claim 2, wherein at least one of said first cover section and said second cover section further comprises at least one vent hole or aperture.

4. The splatter cover apparatus according to claim 2, wherein at least one of said first securing portion of said first securing device and said first securing portion of said second securing device is at least one suction, and wherein said at least one suction permits at least one of said first securing device and said second securing device to be adjustable vertically and laterally along the first side or wall and the second side or wall, respectively, of the interior of the microwave oven.

5. The splatter cover apparatus according to claim 2, wherein at least one of said second securing portion of said first securing device and said second securing portion of said second securing device is at least one vertical slot, and wherein each of said at least one vertical slot is dimensioned and configured to receive and detachably retain a corresponding portion of said first cover section and a corresponding portion of said second cover section, respectively.

6. The splatter cover apparatus according to claim 1, wherein said splatter cover is a two-piece splatter cover comprising a first cover section and a second cover section, wherein said first cover section comprises a top, a sidewall, a first cover section height, and a first cover section diameter, wherein said top of said first cover section comprises a perimeter and an engagement surface or area, wherein said sidewall of said first cover section extends downward from said perimeter of said top of said first cover section;

wherein said second cover section comprises a top, a sidewall, a second cover section height, and a second cover section diameter, wherein said top of said second cover section comprises a perimeter and an engagement surface or area, wherein said sidewall of said second cover section extends downward from said perimeter of said top of said second cover section, and wherein said first cover section and said second cover section, when acting as a one-piece unit when said first cover section and said second cover section come together or toward one another for use, are dimensioned and configured to sufficiently and effectively cover foods and drinks during use such that food and drink splatters are minimized or prevented inside the microwave oven, wherein said at least one securing device is a first securing device and a second securing device, wherein said first securing device is capable of detachably securing said first cover section in proximity or vicinity of a first side or wall of an interior of the microwave oven at a securing height with respect to a bottom side of the interior of the microwave oven, wherein said first securing device comprises a first securing portion and a second securing portion, wherein the first side or wall of the interior of the microwave oven is selected from the group consisting of a door and a side or wall adjacent to the door, wherein said first securing portion of said first securing device is capable of securing said first securing device to the first side or wall of the interior of the microwave oven, and wherein said second securing portion of said first securing device is capable of securing a corresponding portion of said first cover section, wherein said second securing device is capable of detachably securing said second cover section in proximity or vicinity of a second side or wall of the interior of the microwave oven at a securing height with respect to the bottom side of the interior of the microwave oven, wherein said second securing device comprises a first securing portion and a second securing portion, wherein the second side or wall of the interior of the microwave oven is selected from the group consisting of a back wall and a side or wall adjacent to the back wall and also opposite to the side or wall that is adjacent to the door, wherein said first securing portion of said second securing device is capable of securing said second securing device to the second side or wall of the interior of the microwave oven, wherein said second securing portion of said second securing device is capable of securing a corresponding portion of said second cover section, and wherein at least one of said first securing portion of said second securing device and said first securing portion of said second securing device permits a corresponding cover section of said first cover section and said first cover section to be adjustable vertically and laterally along the corresponding side or wall of the interior of the microwave oven.

7. The splatter cover apparatus according to claim 6, wherein at least one of said first cover section and said second cover section further comprises at least one vent hole or aperture.

8. The splatter cover apparatus according to claim 6, wherein said first cover section and second cover section are substantially or exactly the same as one another.

9. The splatter cover apparatus according to claim 6, wherein each of said top of said first cover section and said top of said second cover section has a semi-circle or half-circle configuration.

10. The splatter cover apparatus according to claim 6, wherein each of said top of said first cover section and said top of said second cover section has a semi boot-shape or half boot-shape configuration.

11. The splatter cover apparatus according to claim 6, wherein at least one of said first securing portion of said first securing device and said first securing portion of said second securing device is at least one suction, and wherein said at least one suction permits at least one of said first securing device and said second securing device to be adjustable vertically and laterally along the first side or wall and the second side or wall, respectively, of the interior of the microwave oven.

12. The splatter cover apparatus according to claim 11, wherein at least one of said second securing portion of said first securing device and said second securing portion of said second securing device is at least one vertical slot, and wherein each of said at least one vertical slot is dimensioned and configured to receive and detachably retain a corresponding portion of said first cover section and a corresponding portion of said second cover section, respectively.

13. The splatter cover apparatus according to claim 11, wherein at least one of said second securing portion of said first securing device and said second securing portion of said second securing device is a plurality of vertical slots that are positioned and spaced in a parallel arrangement with one another wherein said plurality of vertical slots permit at least one of said first cover section and said second cover section to be secured at different forward and rearward locations relative to the back wall of the microwave oven during use.

14. The splatter cover apparatus according to claim 11, wherein at least one of said second securing portion of said first securing device and said second securing portion of said second securing device is a first plurality of vertical slots that are positioned and spaced in a first parallel arrangement and a second plurality of vertical slots that are positioned and spaced in a second parallel arrangement, wherein said first parallel arrangement and said second parallel arrangement are arranged in about a ninety degree angle with one another, wherein each of said first plurality of vertical slots and said second plurality of vertical slots permits at least one of said first cover section and said second cover section to be secured at different forward and rearward locations relative to the back wall of the microwave oven during use, and wherein said first plurality of vertical slots and said second plurality of vertical slots differ from one another, when oriented for use, such that at least one of said first cover section and said second cover section are secured at different forward and rearward locations relative to the back wall of the microwave oven during use.

15. The splatter cover apparatus according to claim 1, further comprising at least one vent hole or aperture.

16. The splatter cover apparatus according to claim 1, wherein said splatter cover has a circle configuration.

17. The splatter cover apparatus according to claim 1, wherein said first securing portion is at least one suction.

18. The splatter cover apparatus according to claim 1, wherein said second securing portion is at least one vertical slot.

19. The splatter cover apparatus according to claim 18, wherein said second securing portion is a plurality of vertical slots that are positioned and spaced in a parallel arrangement with one another wherein said plurality of vertical slots permit said splatter cover to be secured at different forward and rearward locations relative to the back side or wall of the microwave oven during use.

20. The splatter cover apparatus according to claim 18, wherein said second securing portion is a first plurality of vertical slots that are positioned and spaced in a first parallel arrangement and a second plurality of vertical slots that are positioned and spaced in a second parallel arrangement, wherein said first parallel arrangement and said second parallel arrangement are arranged in about a ninety degree angle with one another, wherein each of said first plurality of vertical slots and said second plurality of vertical slots permits said splatter cover to be secured at different forward and rearward locations relative to the back side or wall of the microwave oven during use, and wherein said first plurality of vertical slots and said second plurality of vertical slots differ from one another, when oriented for use, such that said splatter cover are secured at different forward and rearward locations relative to the back side or wall of the microwave oven during use.

* * * * *